US012320512B2

(12) United States Patent
Diemel et al.

(10) Patent No.: US 12,320,512 B2
(45) Date of Patent: Jun. 3, 2025

(54) MIRROR AND CABINET APPARATUS

(71) Applicant: Kohler Co., Kohler, WI (US)

(72) Inventors: Douglas J. Diemel, Kohler, WI (US); Feipeng Lv, Shanghai (CN); Yanxiong Zhuang, Shanghai (CN); Haichao Sun, Shanghai (CN); Qiuyue Liu, Shanghai (CN); Linan Han, Shanghai (CN); Kor Han Chew, Shanghai (CN); Yingying Xu, Shanghai (CN); Yuan Gao, Shanghai (CN); Fan Huang, Shanghai (CN); Wendong Zhu, Shanghai (CN); Danni Gu, Shanghai (CN); Mark Schibur, Sheboygan, WI (US); Maxwell Wasscher, Grafton, WI (US); Steve Hammond, Sheboygan Falls, WI (US); Jesse Lemel, Bayside, WI (US); Margaret Mazz, Atlanta, GA (US); Pete Kajuch, Brookfield, WI (US); Erin Lilly, Sheboygan, WI (US); Megan Wehmeier, Cleveland, WI (US); Katie Stevens, Fox Point, WI (US); Katerina Revelis, Sheboygan, WI (US); Shawn Booth, Sheboygan, WI (US); Matthew Wegner, Sheboygan, WI (US); Alexander V. LeToumeau, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 6 days.

(21) Appl. No.: 18/199,140

(22) Filed: May 18, 2023

(65) Prior Publication Data

US 2023/0375169 A1 Nov. 23, 2023

Related U.S. Application Data

(60) Provisional application No. 63/343,375, filed on May 18, 2022.

(30) Foreign Application Priority Data

May 26, 2022 (CN) ......................... 202210588875.2

(51) Int. Cl.
*F21V 23/04* (2006.01)
*F21V 14/02* (2006.01)
*F21Y 115/10* (2016.01)

(52) U.S. Cl.
CPC .......... *F21V 23/0471* (2013.01); *F21V 14/02* (2013.01); *F21Y 2115/10* (2016.08)

(58) Field of Classification Search
CPC ............................. F21V 23/0471; F21V 14/02
See application file for complete search history.

(56) References Cited

U.S. PATENT DOCUMENTS

| | | | |
|---|---|---|---|
| 8,944,617 | B2 | 2/2015 | Crookham et al. |
| 10,894,503 | B2 | 1/2021 | Spero |

(Continued)

OTHER PUBLICATIONS

CarMagazine website, https://www.carmagazine.co.uk/car-news/tech/audi-digital-matrix-led-how-does-it-work/, Published: Jun. 2, 2020, Retrieved May 18, 2023, pp. 1-6.

(Continued)

*Primary Examiner* — Christopher E Dunay
(74) *Attorney, Agent, or Firm* — Lempia Summerfield Katz LLC

(57) ABSTRACT

In one embodiment, the present disclosure is directed to a bathroom mirror lighting system comprising a mirror, a light source, a sensor, and a control circuit operably coupled to the light source and the sensor. The control circuit receives a sensor signal from the sensor indicative of at least one of a user's distance from the sensor, a user's position, a user's posture, a motion of the user towards or away from the sensor, or a task being performed by the user. The control circuit then transmits a control signal to the light source (Continued)

causing the light source to alter its light output based on the sensor signal from the sensor.

15 Claims, 34 Drawing Sheets

(56) References Cited

U.S. PATENT DOCUMENTS

| | | | | |
|---|---|---|---|---|
| 11,460,187 | B1 * | 10/2022 | Acosta | F21V 33/0096 |
| 2013/0088154 | A1 * | 4/2013 | Van Hoof | H05B 47/10<br>315/152 |
| 2020/0256044 | A1 | 8/2020 | Kim et al. | |
| 2023/0255348 | A1 * | 8/2023 | Yao | F21V 23/04<br>362/135 |
| 2023/0326365 | A1 * | 10/2023 | Mixon | G08B 21/245 |
| 2024/0032711 | A1 * | 2/2024 | Wu | G06V 40/172 |
| 2024/0065554 | A1 * | 2/2024 | Serval | G06V 20/20 |

OTHER PUBLICATIONS

Projector Screen website, https://www.projectorscreen.com/blog/How-does-a-DLP-projector-work, Retrieved May 18, 2023, pp. 1-4.

Auto Week website, https://www.autoweek.com/news/technology/a36031601/heres-how-smart-headlights-work/, Retrieved May 18, 2023, pp. 1-8.

* cited by examiner

MIRROR AND CABINET APPARATUS

CROSS REFERENCE TO RELATED APPLICATIONS

The present application claims the benefit of U.S. Provisional Patent Application No. 63/343,375, filed May 18, 2022, and claims priority under 35 U.S.C. § 119 to Chinese Patent Application No. 202210588875.2, filed May 26, 2022. The disclosures of the aforementioned priority applications are incorporated herein by reference in their entireties.

BACKGROUND

Mirrors and cabinets are important items in modern homes, including modern bathrooms. Existing mirrors and cabinets, however, have limited functionality and convenience.

BRIEF SUMMARY

The present disclosure may be directed, in one aspect, to a bathroom mirror lighting system comprising a mirror; a light source; a sensor; and a control circuit operably coupled to the light source and the sensor, the control circuit configured to receive a sensor signal from the sensor indicative of at least one of a user's distance from the sensor, a user's position, a user's posture, a motion of the user towards or away from the sensor, or a task being performed by the user; transmit a control signal to the light source causing the light source to alter its light output based on the sensor signal from the sensor.

In another aspect, a cabinet includes a countertop having front edge and a rear edge; a basin having an opening surrounded by the countertop; a backsplash structure positioned between the basin opening and the rear edge of the countertop, the backsplash structure housing at least a portion of a faucet.

In another aspect, a cabinet includes a countertop having front edge and a rear edge; a basin having an opening surrounded by the countertop; a faucet positioned between the basin opening and the rear edge of the countertop; and a storage area positioned between the faucet and the rear edge of the countertop.

In another aspect, the application provides a cabinet, comprising: a first cabinet body, the first cabinet body provided with one or more cleaning components, and one or more storage components.

Further, the cleaning component comprises a first bathroom basin, a touchless faucet, a touchless cleaning fluid dispenser, a disinfection light source, and/or a hand dryer mounted to the first cabinet body.

The application provides a cabinet, comprising: a second cabinet body, a first command receiving sensor, and a first controller, wherein the second cabinet body is provided with a first storage cabinet, an output end of the first command receiving sensor is communicatively connected to an input end of the first controller; and the first controller controls opening and closing of the first storage cabinet according to a signal from the first command receiving sensor.

The application provides a mirror, comprising: a first mirror face, a second command receiving sensor and a second controller, the first mirror face is provided with a first mirror face light emitting device, an output end of the second command receiving sensor is communicatively connected to an input end of the second controller; and the second controller controls lighting parameters of the first mirror face light emitting device according to a signal from the second command receiving sensor.

Further, the mirror also comprises a mirror cabinet connected to the first mirror face, the second controller controls opening and closing of the mirror cabinet according to a signal from the second command receiving sensor.

The application provides a cabinet, comprising: a third cabinet body, the third cabinet body provided with a planting trough.

Further, the third cabinet body is provided with a second bathroom basin, and a water outlet end of the second bathroom basin is in communication with a water inlet end of the planting trough.

Further, the cabinet also comprises a planting lighting device and/or a plant environment sensor, illumination area of the planting lighting device covers or partially covers the planting trough, and the plant environment sensor detects environmental information of the planting trough.

The application provides a cabinet, comprising: a fourth cabinet body, the fourth cabinet body provided with a third bathroom basin and a bathroom basin lighting device for illuminating the third bathroom basin, the third bathroom basin being a translucent bathroom basin or a transparent bathroom basin.

Further, the third bathroom basin is a translucent bath or a transparent bath, the bathroom basin lighting device is a light strip provided around the third bathroom basin and/or a light projection device projected towards the third bathroom basin.

The application provides a cabinet, comprising: a fifth cabinet body and a pattern projection device, the pattern projection device being provided above the fifth cabinet body and projecting a pattern to the fifth cabinet body.

The application provides a furniture combination, comprising: a sixth cabinet body having a cleaning component and a storage wall located on one side of the sixth cabinet body.

The application provides a cabinet, comprising: a seventh cabinet body, the seventh cabinet body provided with a second storage cabinet, the second storage cabinet provided with a second storage cabinet handle, the second storage cabinet handle provided with a first handle light emitting device.

The application provides a mirror, comprising: a second mirror face, a second mirror face guiding rail, and a second mirror face handle, wherein the second mirror face is connected to the second mirror face guiding rail and capable of sliding along the second mirror face guiding rail, the second mirror face handle is fixedly connected to the second mirror face, and the second mirror face handle is provided with a second handle light emitting device.

The application provides a cabinet, comprising: an eighth cabinet body, the eighth cabinet body provided with a third storage cabinet, the third storage cabinet provided with a third storage cabinet handle, and the third storage cabinet handle provided with a first health information sensor.

The application provides a mirror comprising: a third mirror face, a third mirror face guiding rail, and a third mirror face handle, wherein the third mirror face is connected to the third mirror face guiding rail and capable of sliding along the third mirror face guiding rail, the third mirror face handle is fixedly connected to the third mirror face, and the third mirror face handle is provided with a second health information sensor.

The application provides a cabinet comprising: a ninth cabinet body and a cabinet body heating device fixed to the ninth cabinet body.

The application provides a mirror comprising: a fourth mirror face and a mirror face heating device fixedly connected to the fourth mirror face.

The application provides a mirror comprising: a fifth mirror face, a fifth mirror face light emitting device, an audio capture device, and a third controller, an output end of the audio capture device is communicatively connected to an input end of the third controller, an output end of the third controller is communicatively connected to the fifth mirror face light emitting device, the third controller controls lighting parameters of the fifth mirror face light emitting device according to an audio signal captured by the audio capture device.

The application provides a mirror comprising: a light source and an attachment device fixedly connected to the light source.

The application provides a mirror comprising: a sixth mirror face and a mirror face bracket fixedly connected to the sixth mirror face, the mirror face bracket being provided with one or more storage compartments.

The application provides a mirror comprising: a seventh mirror face, a mirror face environment sensor and a fourth controller, wherein the seventh mirror face is provided with a seventh mirror face light emitting device, an output end of the mirror face environment sensor is communicatively connected to an input end of the fourth controller, an output end of the fourth controller is communicatively connected to the seventh mirror face light emitting device, the fourth controller controls lighting parameters of the seventh mirror face light emitting device according to an environment information of the mirror environment sensor.

The application provides a cabinet, comprising: a tenth cabinet body and a fifth controller, the tenth cabinet body being provided with an illuminating panel, the fifth controller being communicatively connected to the illuminating panel to control display parameters of the illuminating panel.

The application provides a mirror comprising: an eighth mirror face, a radio device, a sixth controller, and a display device fixedly connected to the eighth mirror face, an output end of the radio device is communicatively connected to an input end of the sixth controller, and an output end of the sixth controller is communicatively connected to the display device.

BRIEF DESCRIPTION OF THE DRAWINGS

The present disclosure will become more fully understood from the detailed description and the accompanying drawings, wherein.

Figure 1:
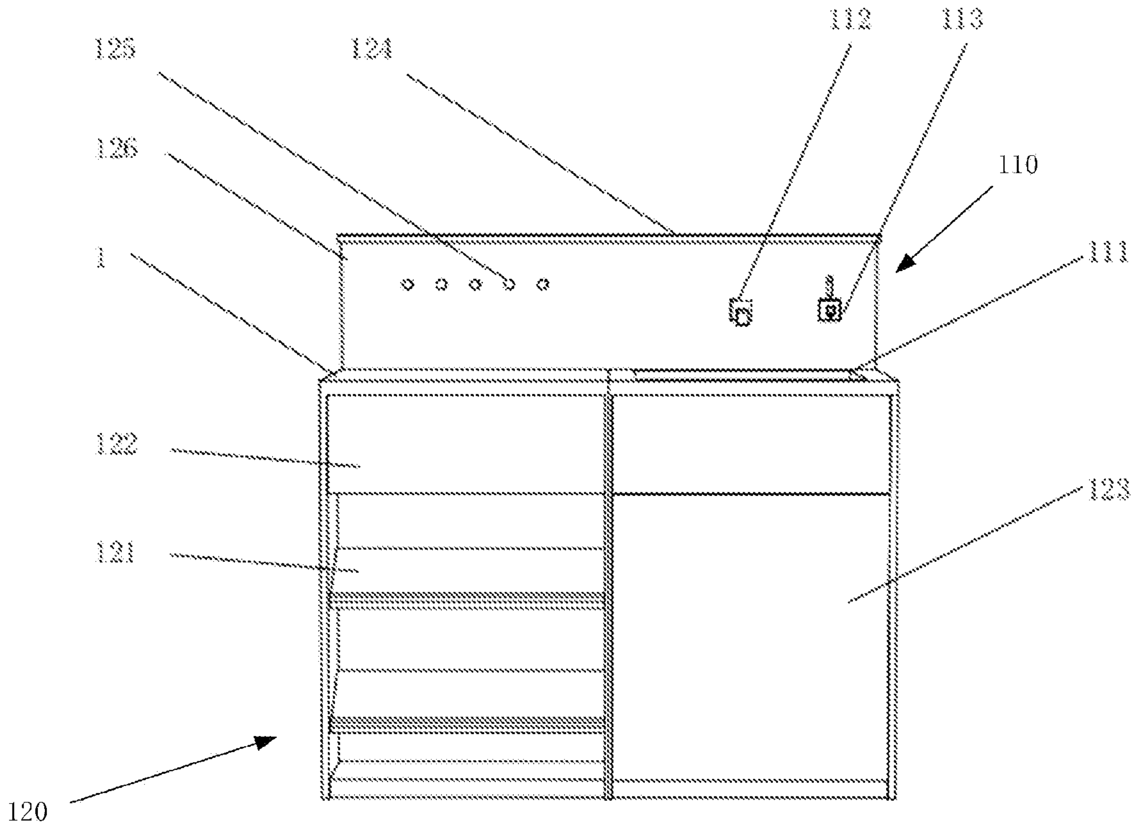
FIG. 1 is a schematic diagram of a cabinet of the first embodiment of the application.

The drawings represent one or more embodiments of the present invention(s) and do not limit the scope of invention.

DETAILED DESCRIPTION

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present inventions. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true. Furthermore, as used herein, the phrase "based on" is to be interpreted as meaning "based at least in part on," and therefore is not limited to the interpretation "based entirely on." Furthermore, the term "each," when used in reference to each of a plurality of items, need not refer to each such item in an entire system or apparatus, but may instead simply refer to each of the recited one or more such items in the system.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

In the following description, where block diagrams or circuits are shown and described, one of skill in the art will recognize that, for the sake of clarity, not all peripheral components or circuits are shown in the figures or described in the description. For example, common components such as memory devices and power sources may not be discussed herein, as their role would be easily understood by those of ordinary skill in the art. Further, the terms "couple" and "operably couple" can refer to a direct or indirect coupling of two components of a circuit.

It is noted that for the sake of clarity and convenience in describing similar components or features, the same or similar reference numbers may be used herein across different embodiments or figures. This is not to imply that the components or features identified by a particular reference number are identical across each embodiment or figure, but only to suggest that the components or features are similar in general function or identity.

Features of the present inventions may be implemented in software, hardware, firmware, or combinations thereof. The computer programs described herein are not limited to any particular embodiment, and may be implemented in an operating system, application program, foreground or background processes, driver, or any combination thereof. The computer programs may be executed on a single computer or server processor or multiple computer or server processors.

Processors described herein may be any central processing unit (CPU), microprocessor, micro-controller, computational, or programmable device or circuit configured for executing computer program instructions (e.g., code). Various processors may be embodied in computer and/or server hardware of any suitable type (e.g., desktop, laptop, notebook, tablets, cellular phones, etc.) and may include all the usual ancillary components necessary to form a functional data processing device including without limitation a bus, software and data storage such as volatile and non-volatile memory, input/output devices, graphical user interfaces (GUIs), removable data storage, and wired and/or wireless communication interface devices including Wi-Fi, Bluetooth, LAN, etc. As used herein, the term "processor" may refer to one or more processors.

Computer-executable instructions or programs (e.g., software or code) and data described herein may be programmed into and tangibly embodied in a non-transitory computer-readable medium that is accessible to and retrievable by a respective processor as described herein which configures and directs the processor to perform the desired functions and processes by executing the instructions encoded in the medium. A device embodying a programmable processor configured to such non-transitory computer-executable instructions or programs may be referred to as a "programmable device", or "device", and multiple programmable devices in mutual communication may be referred to as a "programmable system." It should be noted that non-transitory "computer-readable medium" as described herein may include, without limitation, any suitable volatile or non-volatile memory including random access memory (RAM) and various types thereof, read-only memory (ROM) and various types thereof, USB flash memory, and magnetic or optical data storage devices (e.g., internal/external hard disks, floppy discs, magnetic tape CD-ROM, DVD-ROM, optical disk, ZIP™ drive, Blu-ray disk, and others), which may be written to and/or read by a processor operably connected to the medium.

In certain embodiments, the present inventions may be embodied in the form of computer-implemented processes and apparatuses such as processor-based data processing and communication systems or computer systems for practicing those processes. The present inventions may also be embodied in the form of software or computer program code embodied in a non-transitory computer-readable storage medium, which when loaded into and executed by the data processing and communications systems or computer systems, the computer program code segments configure the processor to create specific logic circuits configured for implementing the processes.

Cabinet, Mirror, and Furniture Combinations

Embodiment 1

Figure 2:
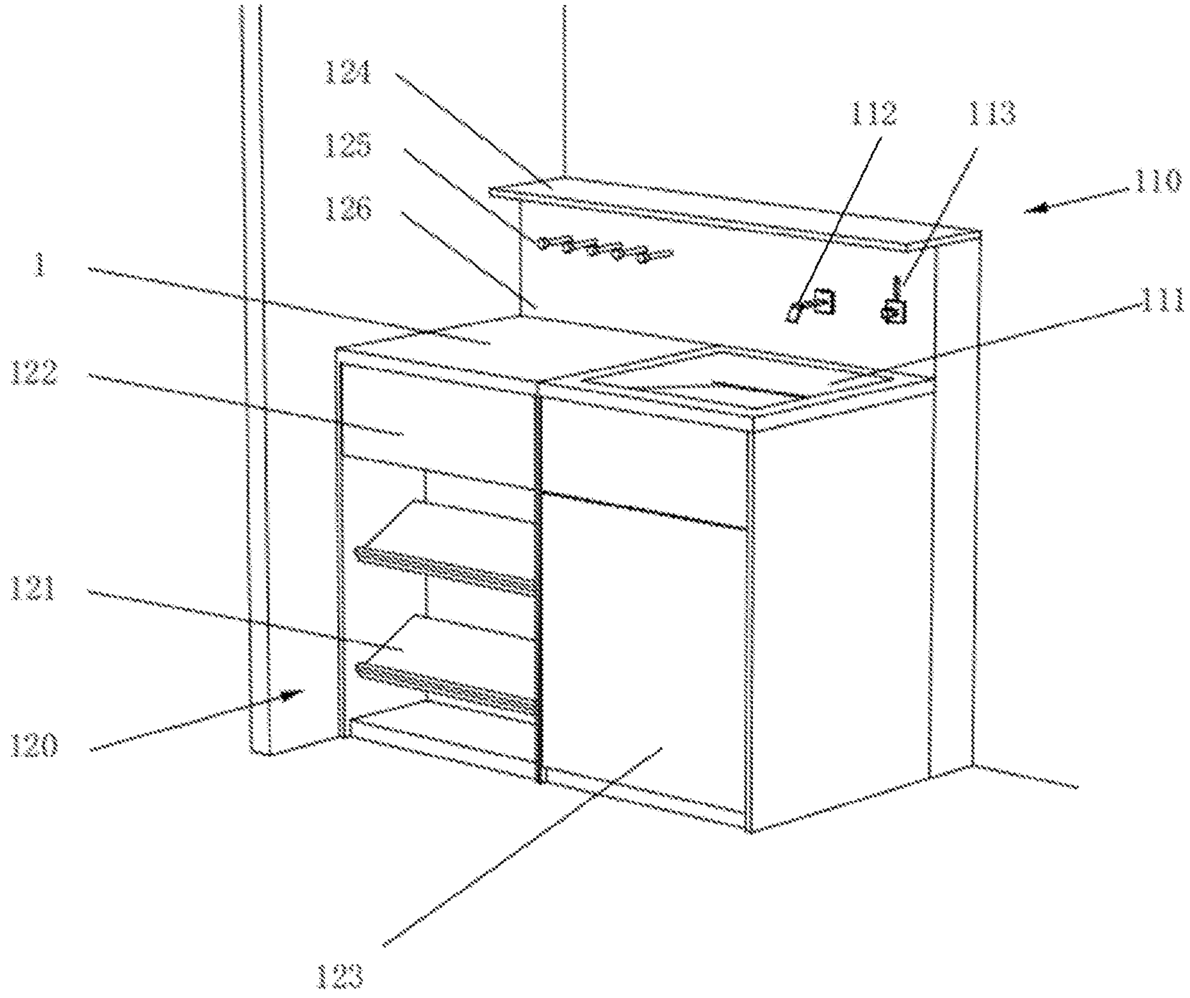
FIG. 2 is a schematic diagram of the cabinet of the first embodiment of the application, from another view.
Figure 3:
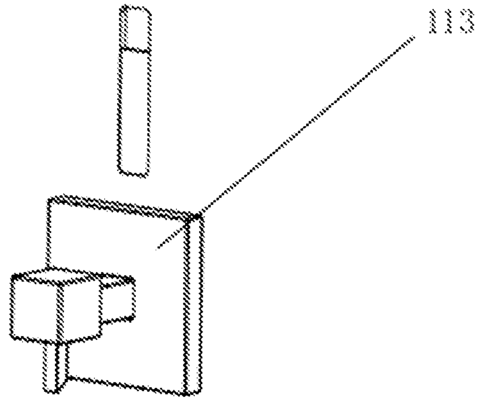
FIG. 3 is an enlarged schematic diagram of a touchless cleaning fluid dispenser of the first embodiment of the application.

As shown in FIGS. 1 and 2 illustrating a schematic diagram of a cabinet of a first embodiment of the application, the cabinet comprises: a first cabinet body 1 provided with one or more cleaning components 110, and one or more storage components 120.

Specifically, the cabinet may be a dressing cabinet, a cupboard, and the like. The cabinet of this embodiment are preferably used at the entrance of the home. The cleaning component 110 provides a cleaning function and the storage component 120 provides an item storage function. The position relationship between the cleaning component 110 and the storage component 120 is set as needed, comprising but not limited to: the storage component 120 is located below the cleaning component 110, the storage component 120 is located to the side of the cleaning component 110, and/or the cleaning component 110 is located within the storage component 120.

Preferably, the storage component 120 comprises a shelf 121, drawer 122, storage cabinet 123, support plate 124, and/or hook 125. Wherein, the shelf 121 is preferably a shoe rack, etc. The drawer 122 and the storage cabinet 123 are used to store the user's items. The support plate 124 is used to support the user's items. The hook 125 is preferably provided on a baffle 126, and the user may hang the items on the hook 125.

Trash cans may also be provided inside the storage cabinet 123 to place wasted masks, etc. The trash can may be a touchless trash can, opened and closed by hand gesture, infrared means, etc.

The cleaning component 110 may be a bathroom basin, faucet, cleaning fluid dispenser, etc.

In one of the embodiments, the cleaning components 110 comprise a first bathroom basin 111, a touchless faucet 112, a touchless cleaning fluid dispenser 113, a disinfection light source and/or a hand dryer mounted to the first cabinet body 1.

Specifically, the cleaning components 110 are used to provide a cleaning function and comprise the touchless faucet 112, the touchless cleaning fluid dispenser 113, the disinfection light source, and/or the hand dryer.

In one of the embodiments, the first bathroom basin 111 is a splash-proof pool. Specifically, the edge of the first bathroom basin 111 may comprise a waterproof baffle, or the depth of the first bathroom basin 111 may be increased so that the water splashing height does not exceed the depth of the first bathroom basin 111.

The touchless faucet 112 and touchless cleaning fluid dispenser 113 provide touchless cleaning function. The touchless faucet 112 and touchless cleaning fluid dispenser 113 are preferably provided above the first bathroom basin 111.

The disinfection light source is preferably an ultraviolet light source to disinfect the user's items. The disinfection light source may be located inside or outside of the storage component 120.

Preferably, the disinfection light source is mounted in the shelf 121, drawer 122, and/or storage cabinet 123 to disinfect clothing, shoes, and other items placed inside.

The disinfection light source may also be located on the side of the first bathroom basin 111 to disinfect the water from the touchless faucet 112 to achieve a cleaner hand washing. The disinfection light source may also be mounted in the first bathroom basin 111 to self-clean the first bathroom basin 111.

The embodiment of this application adds a cleaning function to the cabinet to meet the cleaning needs of people when they enter the house.

Embodiment 2

Figure 4:
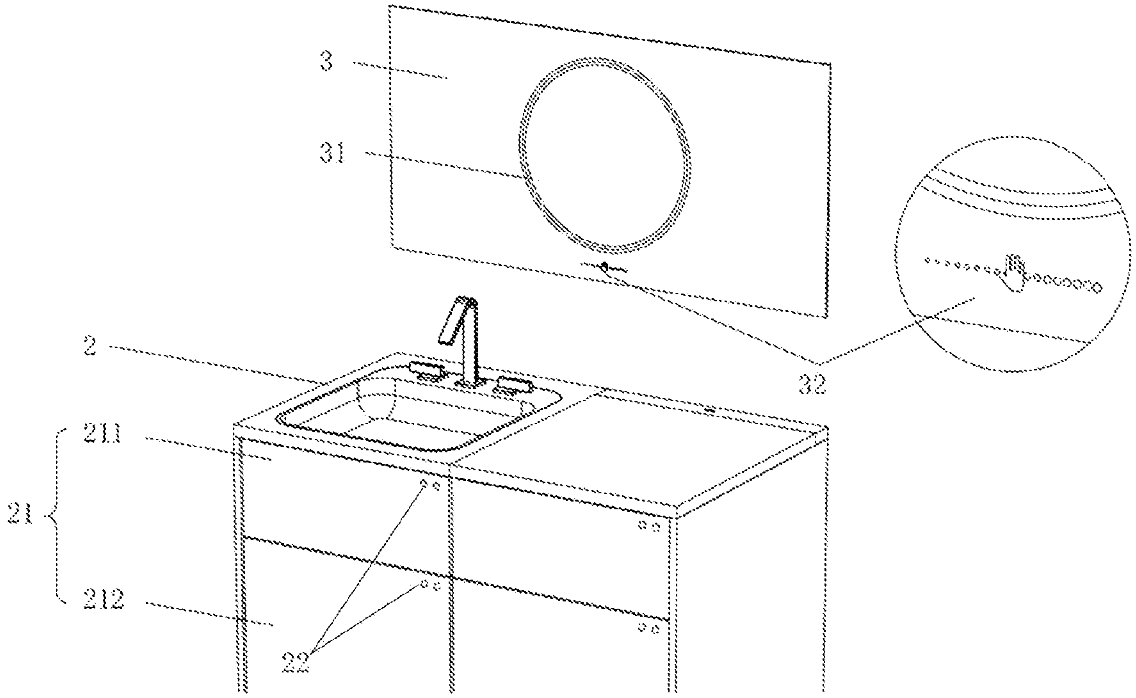
FIG. 4 is a schematic diagram of a cabinet and a mirror of the second embodiment of the application.

A cabinet as shown in FIG. 4, comprises: a second cabinet body 2, a first command receiving sensor 22, and a first controller (not shown in the figure), the second cabinet body 2 is provided with a first storage cabinet 21, an output end of the first command receiving sensor 22 is communicatively connected to an input end of the first controller;

The first controller controls opening and closing of the first storage cabinet 21 according to the signal of the first command receiving sensor 22.

Specifically, one of people's concerns about sanitation comes from contact with items. This embodiment adds the first command receiving sensor 22 to detect the user's command, and based on the received command, the first controller controls opening or closing of the first storage cabinet 21 to reduce the contact with the cabinet.

Wherein, the first command receiving sensor 22 may be a gesture sensor, a voice receiving device, or a communication receiving device. The gesture information may be a wave or other specific gesture action. The first command receiving sensor 22 may be an infrared sensor, an ultrasonic sensor, or a camera The user gesture is determined by sensing the change in distance between the user's hand and the first command receiving sensor 22, or by photographing the user's hand movement and performing image recognition. Specifically, the detected infrared, ultrasonic, or image signals, etc., may be sent to the first controller, which then recognizes the various signals to determine the gesture.

The first command receiving sensor 22 may also be a microphone for receiving the user's voice. The user speaks a control command, and then the voice received by the microphone is recognized by the first controller to determine the corresponding command.

The first command receiving sensor 22 may also be a communication receiving device to receive commands from the user via a cell phone application (APP) and then send the commands to the first controller.

The first storage cabinet 21 may be any kind of existing storage cabinet, for example, a drawer 211 or hinged storage cabinet 212. For the drawer 211, the first controller is communicatively connected to the drawer drive device, which drives the drawer 211 to extend or retract along the guiding rail. The drawer drive device may be a motor drive device. For the hinged storage cabinet 212, the first controller is communicatively connected to the storage cabinet drive device, and the storage cabinet drive device drives a cabinet door of the hinged storage cabinet 212 to open or close. The cabinet door of the hinged storage cabinet 212 is hinged to the second cabinet body 2, and the storage cabinet drive device may be a motor that drives the cabinet door of the storage cabinet to rotate to open or close.

This embodiment allows the user to open the cabinet door without touching it, thus satisfying the user's need for touchless cleaning.

In one of the embodiments, the second cabinet body 2 is further provided with a controller accommodating device to hold the first controller. The user may set the first controller to personalize the opening and closing of the controlled first storage cabinet 21. The user may set the first controller by touchless ways, for example, by gestures.

In one of the embodiments, the second cabinet body 2 is further provided with a setter accommodating device to hold a setter that is communicatively connected with the first controller. The user can set the setter, and the setter sends the received setting commands to the first controller to personalize opening and closing of the controlled first storage cabinet 21. The user may set the setter by touchless ways, for example, by gestures. The setter is preferably a tablet (iPad), and the setter accommodating device is preferably a tablet dock (iPad dock).

A mirror as shown in FIG. 4, comprises: a first mirror face 3, a second command receiving sensor 32 and a second controller (not shown in the figure), the first mirror face 3 is provided with a first mirror face light emitting device 31, an output end of the second command receiving sensor 32 is communicatively connected to an input end of the second controller; the second controller controls lighting parameters of the first mirror face light emitting device 31 according to a signal from the second command receiving sensor 32.

Specifically, this embodiment adds a second command receiving sensor to detect the user's command, and according to the received command, the second controller controls the lighting parameters of the first mirror face light emitting device to reduce the contact with the mirror.

Wherein, the second command receiving sensor 32 may be a gesture sensor, a voice receiving device, or a communication receiving device. The gesture information may be a wave or other specific gesture action. The second command receiving sensor 32 may be an infrared sensor, an ultrasonic sensor, or a camera. The user gesture is determined by sensing the change in distance between the user's hand and the second command receiving sensor 32, or by photographing the user's hand movement and performing image recognition. Specifically, the detected infrared, ultrasonic, or image signals, etc., may be sent to the second controller, the second controller then recognizes the various signals to determine the gesture.

The second command receiving sensor 32 may also be a microphone for receiving the user's voice. The user speaks a control command, and then the voice received by the microphone is recognized by the second controller to determine the corresponding command.

The second command receiving sensor 32 may also be a communication receiving device to receive commands from the user via a cell phone application (APP) and then send the commands to the second controller.

The first mirror face light emitting device 31 is integrated in the first mirror face 3 or connected to the first mirror face 3. The first mirror face light emitting device 31 may be any kind of existing light fixture. The light parameters of the first mirror face light emitting device 31 comprise but are not limited to: on, off, light color, light brightness, luminous frequency, etc.

This embodiment allows the user to achieve lighting control without touching the mirror face, thus satisfying the user's need for touchless cleaning. The lighting control may be controlled by sensors, sound, or cell phone application. Even with wet hands or in the shower, the user may control and use the lights.

In one of the embodiments, a controller accommodating device is also provided to place a second controller. The user may set the second controller to personalize and save the lighting parameters of the controlled first mirror face light emitting device 31. The user may set the second controller by touchless ways, for example, by gestures. The controller accommodating device may be placed, for example, on the second cabinet body 2.

In one of the embodiments, a setter accommodating device is also provided to place a setter that is communicatively connected with the second controller. The user may set the setter, and the setter sends the received setting commands to the second controller to personalize and save the lighting parameters of the controlled first mirror face light emitting device 31. The user may set the setter by touchless ways, for example, by gestures. The setter is preferably a tablet (iPad), and the setter accommodating device is preferably a tablet dock (iPad dock). The controller accommodating device may be placed, for example, on the second cabinet body 2.

In one of the embodiments, a mirror cabinet connected to the first mirror face 3 is further comprised, and the second controller controls opening and closing of the mirror cabinet based on signals from the second command receiving sensor 32.

Specifically, the second controller is communicatively connected to the mirror cabinet drive device and controls the mirror cabinet drive device to open or close the mirror cabinet. The mirror cabinet drive device may be a motor that drives a cabinet door of the mirror cabinet to rotate to open or close.

Wherein, the first mirror face 3 may be connected to the cabinet door of the mirror cabinet, or the first mirror face 3 is hinged to the mirror cabinet as the cabinet door of the mirror cabinet.

In one of the embodiments, the cabinet, faucet, and/or decoration of the Artist Edition (AE) is provided with a light emitting device, a command receiving sensor, and a controller, an output end of the command receiving sensor is communicatively connected to an input end of the controller, and the controller controls the light parameters of the light emitting device based on signals from the command receiving sensor.

The command receiving sensor of this embodiment may be a gesture sensor, a voice receiving device or a communication receiving device. The gesture information may be a wave or other specific gesture action. Specifically, the command receiving sensor may be an infrared sensor, an ultrasonic sensor, or a camera The user gesture is determined by sensing the change in distance between the user's hand and the command receiving sensor, or by photographing the user's hand movement and performing image recognition. Specifically, the detected infrared, ultrasonic, or image signals, etc., may be sent to the controller, the controller then recognizes the various signals to determine the gesture.

The command receiving sensor of this embodiment may also be a microphone for receiving the user's voice. The user speaks a control command, and then the voice received by the microphone is recognized by the controller to determine the corresponding command.

The command receiving sensor may also be a communication receiving device to receive commands from the user via a cell phone application (APP) and then send the commands to the controller.

The light emitting device is integrated into or connected to the cabinet, faucet, and/or decoration of the Artist Edition. The light emitting device may be any kind of existing light fixture. The light parameters of the light emitting device comprise but are not limited to: on, off, light color, light brightness, luminous frequency, etc.

This embodiment allows the user to achieve lighting control without touching the item, thus satisfying the user's need for touchless cleaning. The lighting control may be controlled by sensors, sound, or cell phone application. Even with wet hands or in the shower, the user may control and use the lights.

Embodiment 3

Figure 5:
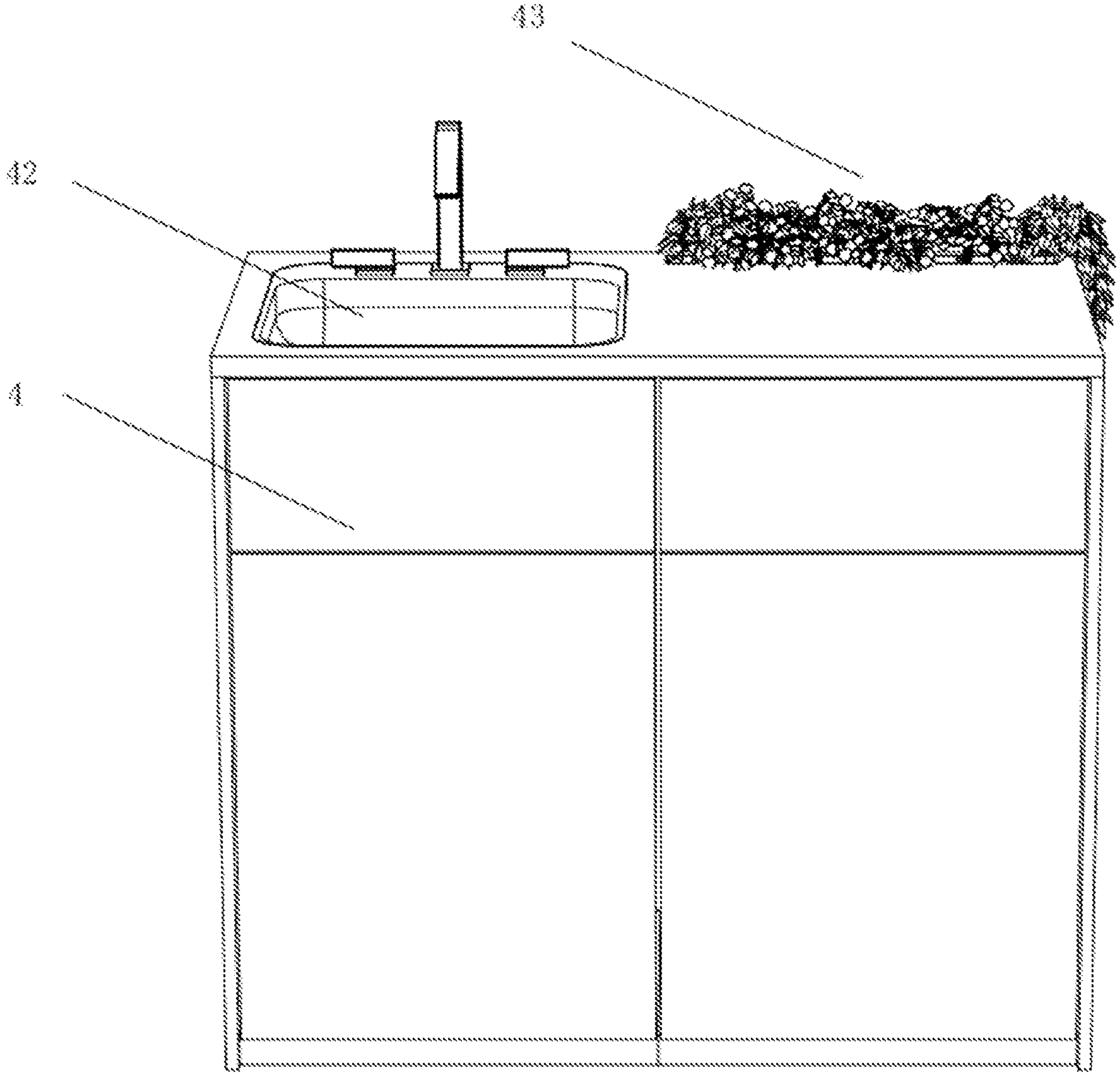
FIG. 5 is a schematic diagram of a cabinet of the third embodiment of the application.
Figure 6:
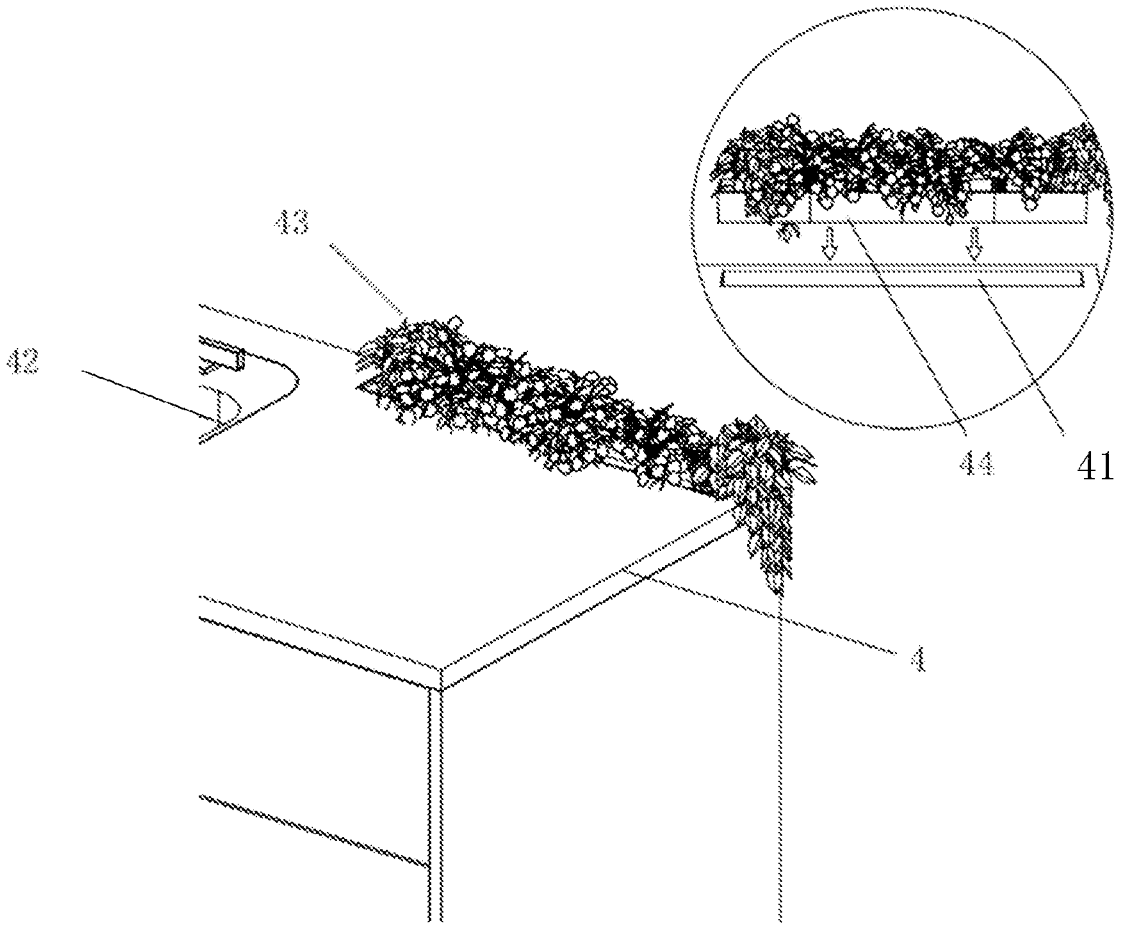
FIG. 6 is an enlarged schematic diagram of a planting trough of a third embodiment of the application.

A schematic diagram of a cabinet of the third embodiment of the application is shown in FIGS. 5 and 6, which comprises: a third cabinet body 4 provided with a planting trough 41.

Specifically, in order to make people return to green life and nature, this embodiment provides the planting trough 41 in the third cabinet body 4. Users may grow plants in the planting trough 41 to meet the user's demand for returning to nature.

The third cabinet body 4 may be a vanity or a cupboard. The plants 43 may be placed in integrated pots, vases, or other plant containers 44 for plant growth, and then the plant containers 44 are placed in the planting trough 41. Preferably, the planting trough 41 is located at a top of the third cabinet body 4.

In one of the embodiments, the third cabinet body 4 is further provided with a second bathroom basin 42, a water outlet end of the second bathroom basin 42 is in communication with a water inlet end of the planting trough 41.

Specifically, the water outlet end of the second bathroom basin 42 may be connected to the planting trough 41 via a drainage pipe, so that the water from the second bathroom basin 42 may be used for irrigating the plants in the planting trough 41. The planting trough 41 may also be provided with drainage holes to facilitate drainage. For example, rice, fruit and vegetable washing water may be used to irrigate the plants in the planting trough 41.

In one of the embodiments, the cabinet also comprises a planting lighting device and/or a plant environment sensor, illuminating area of the planting lighting device covers or partially covers the planting trough 41, and the plant environment sensor detects environmental information of the planting trough 41.

Specifically, the planting trough 41 attachment may also be provided with the planting lighting device and/or the plant environment sensor. Wherein the planting lighting device may be a grow lamp to provide a light source for the plants. The plant sensors make it easier for the user to take care of the plants. Plant sensors comprise but are not limited to: temperature sensors, humidity sensors, photometric sensors, etc. The information from the plant sensors may be communicated with the user's phone and displayed through the user's phone application.

This embodiment satisfies people's need for returning to nature by adding a planting trough and provides a planting lighting device and plant environment sensors to help people grow plants better. Finally, the water outlet end of the bathroom basin is in communication with the planting trough, which saves water and is more environmentally friendly.

Embodiment 4

Figure 7:
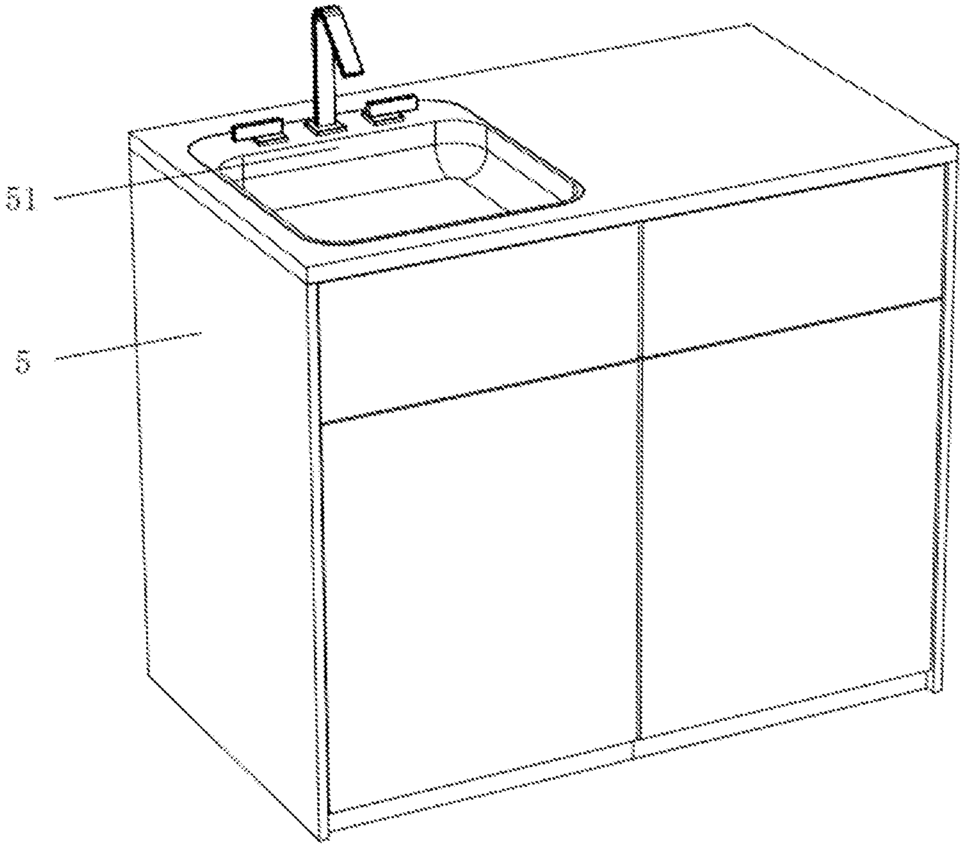
FIG. 7 is a schematic diagram of a cabinet of the fourth embodiment of the application.
Figure 8:
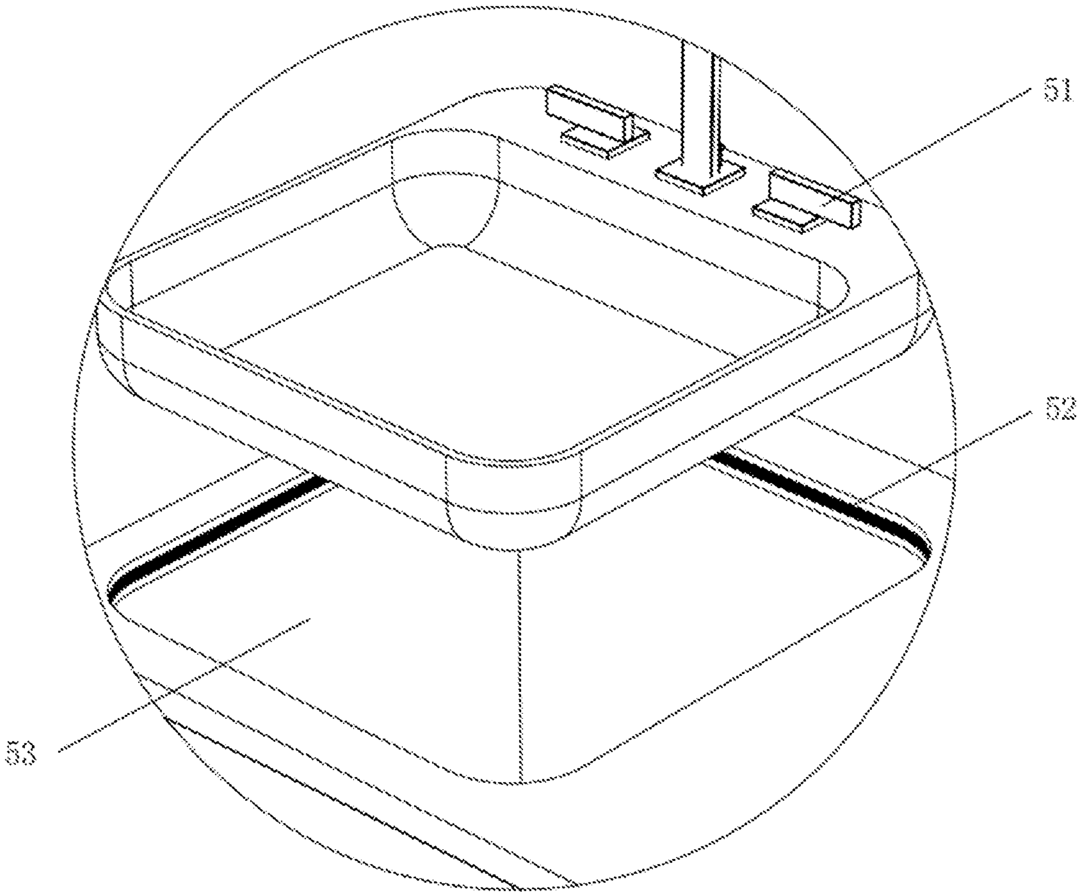
FIG. 8 is a schematic diagram of a bathroom basin in conjunction with a bathroom basin lighting device of the fourth embodiment of the application.

A schematic diagram of a cabinet of a fourth embodiment of the application is shown in FIGS. 7 and 8, which comprises: a fourth cabinet body 5 provided with a third bathroom basin 51 and a bathroom basin lighting device 52 illuminating the third bathroom basin 51, the third bathroom basin 51 being a translucent bathroom basin or a transparent bathroom basin.

Specifically, the fourth cabinet body 5 of this embodiment is provided with the third bathroom basin 51, and the third bathroom basin 51 is a translucent bathroom basin or a transparent bathroom basin made of translucent or transparent material. Bathroom basin lighting device 52 illuminates colored light to the third bathroom basin 51, so that the third bathroom basin 51 may show the corresponding color by means of the emitted light, creating advanced aesthetic of the bathroom basin.

In one of the embodiments, the bathroom basin lighting device 52 is a light strip arranged around the third bathroom basin 51 and/or a light projection device projecting light toward the third bathroom basin 51.

Specifically, as shown in FIG. 8, the fourth cabinet body 5 is provided with a bathroom basin mounting hole 53, a circle of light strip is provided around the bathroom basin mounting hole 53 as the bathroom basin lighting device 52, and then the third bathroom basin 51 is placed on the bathroom basin mounting hole 53.

Alternatively, the light projection device is provided above the fourth cabinet body 5 to project light onto the third bathroom basin 51. For example, a mirror is placed above the fourth cabinet body 5 and the light projection device is placed on a top of the mirror to project light.

Wherein, the light illuminated by the bathroom basin lighting device 52 may be sequential light or interrupted light. For example, the bathroom basin lighting device 52 may be a light strip that emits sequential light, or may be multiple segments of light strips with a predetermined gap between any two adjacent light strips, to leave a transparent point or transparent segment. For example, the bathroom basin lighting device 52 is the light projection device, and the light projection device projects sequential light, or project interrupted light with the transparent point or transparent segment between two adjacent segments of lights.

This embodiment makes the appearance of the bathroom basin more artistic by combining the transparent or translucent bathroom basin and light.

Embodiment 5

Figure 9:
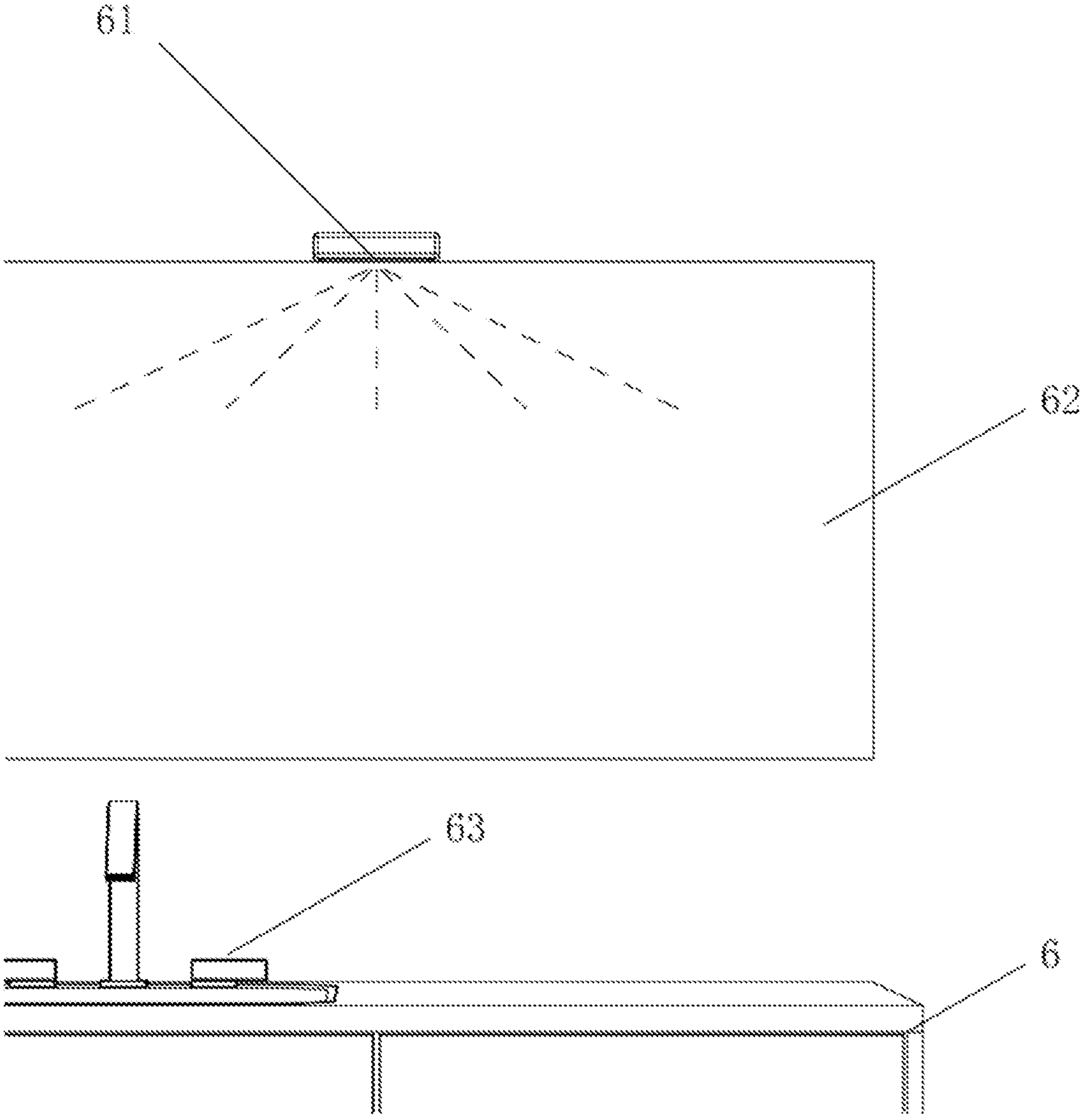
FIG. 9 is a schematic diagram of a cabinet of the fifth embodiment of the application.
Figure 10:
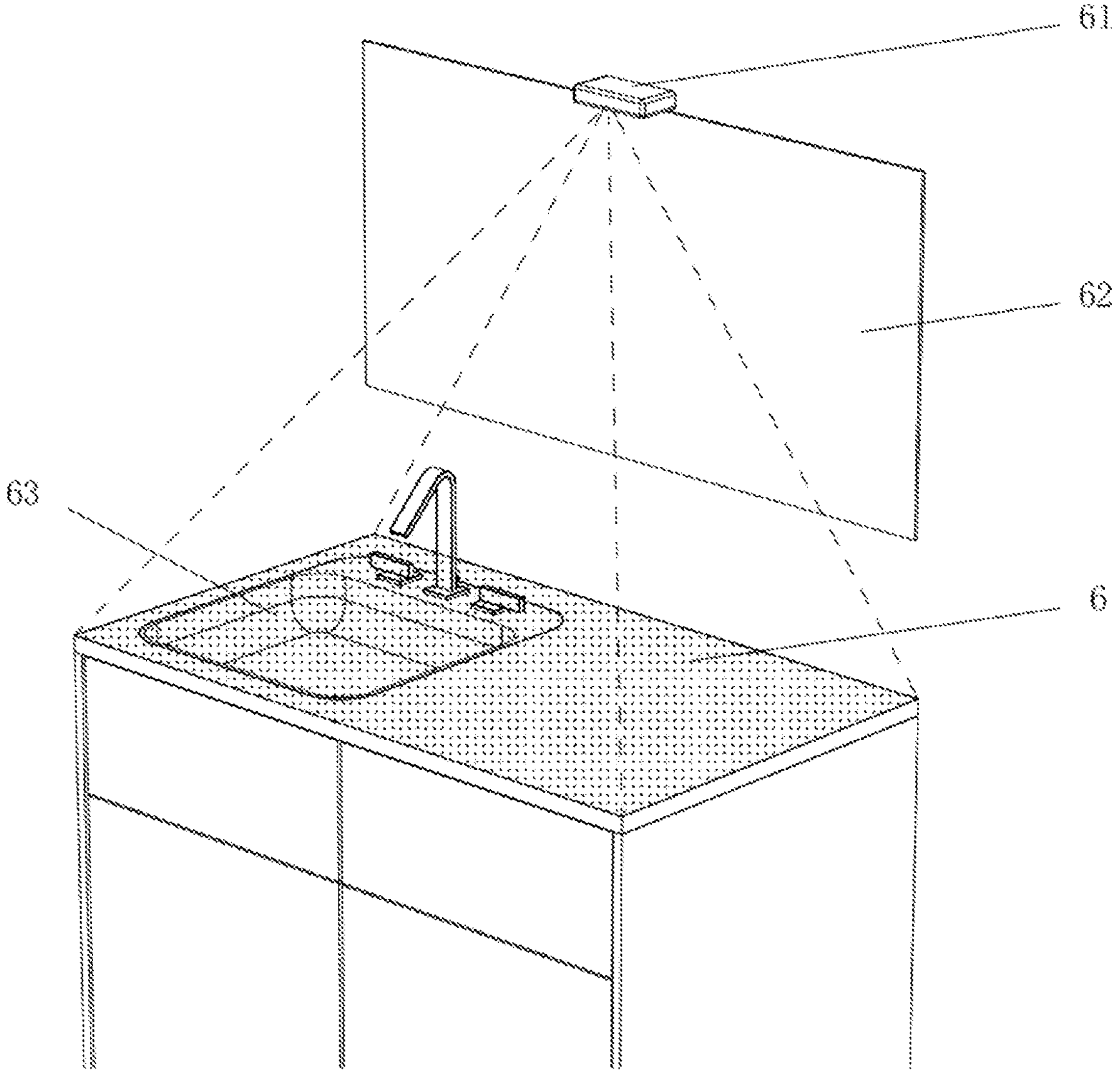
FIG. 10 is a schematic diagram of a cabinet of the sixth embodiment of the application.

A schematic diagram of a cabinet of a fifth embodiment of the application is shown in FIGS. 9 and 10, which comprises: a fifth cabinet body 6 and a pattern projection device 61 provided above the fifth cabinet body 6 and projecting a pattern to the fifth cabinet body 6.

Specifically, the pattern projection device 61 is provided above the fifth cabinet body 6 to project a pattern to the fifth cabinet body 6. Wherein, the pattern projection device 61 is preferably a projector. More preferably, the pattern projection device 61 is a short-focus projector.

Preferably, a mirror 62 is provided above the fifth cabinet body 6, and the pattern projection device 61 is provided on a top of the mirror 62 to project the pattern onto the fifth cabinet body 6. The projection area comprises the cabinet surface of the fifth cabinet body 6 and/or a bathroom basin 63 on the fifth cabinet body 6. Wherein, the bathroom basin 63 may be transparent, translucent, or opaque bathroom basin.

The pattern projected by the pattern projection device 61 comprises, but is not limited to, a twinkling star pattern, a galaxy pattern, a mountain pattern, etc.

The projected patterns may also be changed at regular intervals as needed.

This embodiment projects patterns to the cabinet body through the pattern projection device, thereby changing the appearance of the cabinet surface to meet the personalized needs of the user.

Embodiment 6

Figure 11:
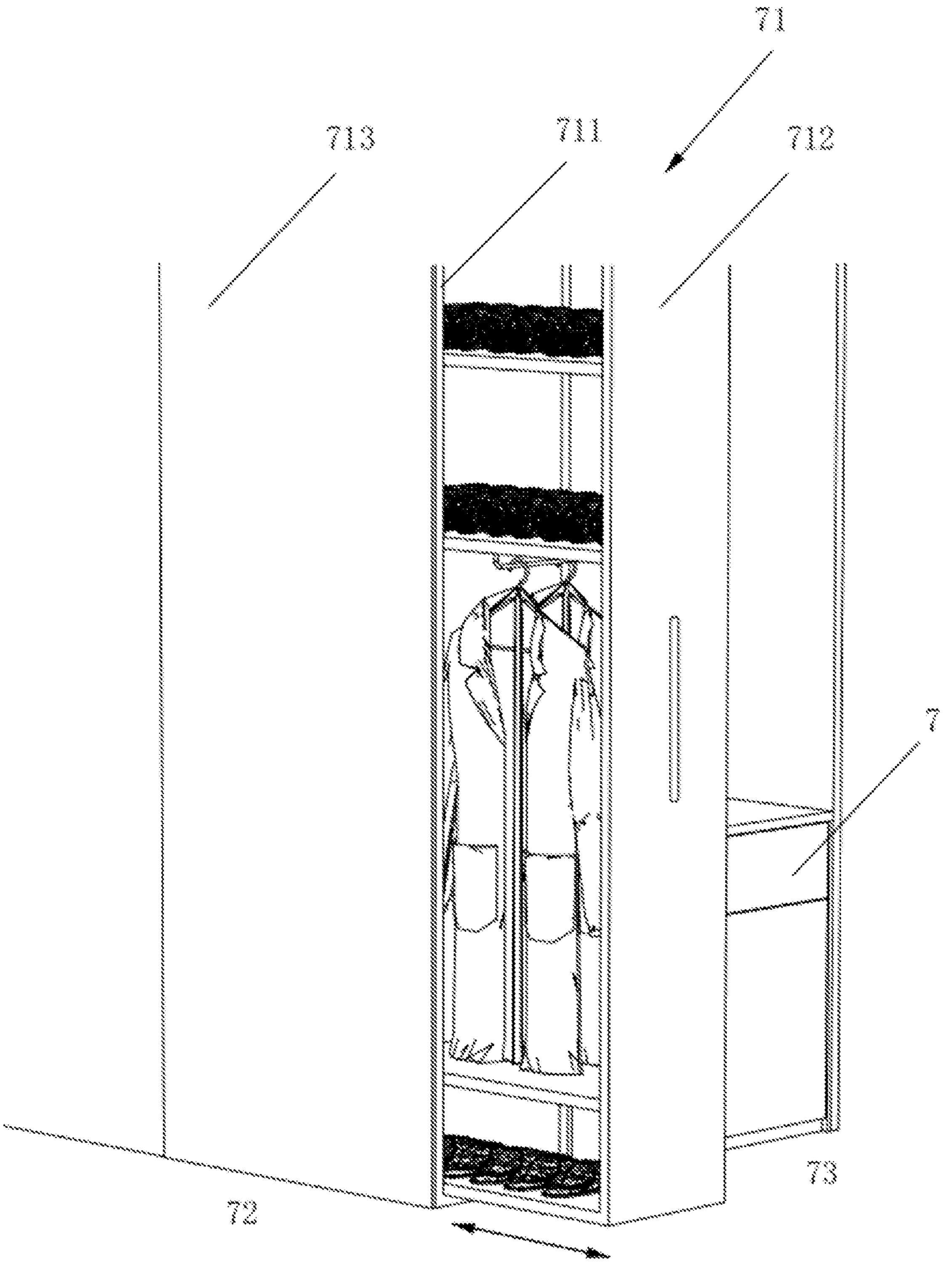
FIG. 11 is a schematic diagram of a furniture combination of the sixth embodiment of the application.
Figure 12:
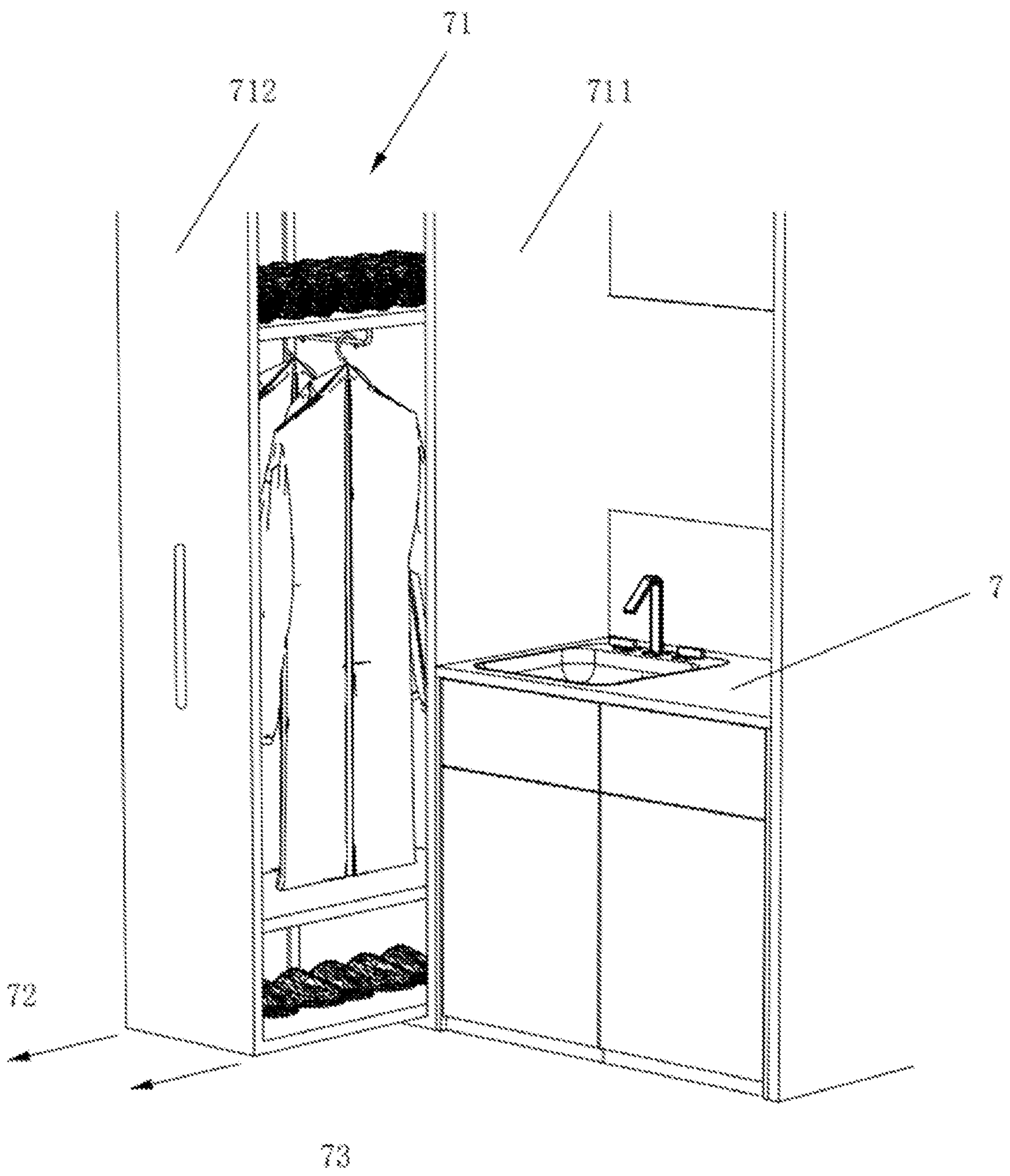
FIG. 12 is a schematic diagram of the furniture combination of the sixth embodiment of the application, from another view.

A schematic diagram of a furniture combination of a sixth embodiment of the application is shown in FIGS. 11 and 12, which comprises: a sixth cabinet body 7 having cleaning components and a storage wall 71 located on one side of the sixth cabinet body 7.

Specifically, the cleaning components comprises, but are not limited to: a bathroom basin, a faucet, a cleaning fluid dispenser, etc. Since the sixth cabinet body 7 is provided with cleaning components, it is easy to get the floor wet when in use. This embodiment divides the area into a dry zone 72 on one side of the storage wall 71 and a wet zone 73 on the other side of the storage wall 71 by the storage wall 71. Wherein, the area on one side of the storage wall 71 where the sixth cabinet body 7 is located is the wet zone 73 and the area on the other side of the storage wall 71 away from the sixth cabinet body 7 is the dry zone 72.

The storage wall 71 divides the living space, wherein the dry zone 72 may be connected to the living room. The storage wall 71 may have a full body mirror 713 facing the living room on the side of the dry zone 72. The storage wall 71 may store towels, bathrobes, and other items on the side of the wet zone 73.

The storage wall 71 may also be a pull-out storage wall. In one of the embodiments, the storage wall 71 comprises a wall body 711 and a storage component 712 housed within the wall body 711, and the storage component 712 is capable of being extended or retracted from the wall body 711.

Specifically, the wall body 711 is hollow and the storage component 712 is preferably a pull-out closet. A guiding rail may be provided within the wall body 711 and the storage component 712 may be placed on the guiding rail so that the storage component 712 may be extended or retracted Brackets may be provided within the storage components 712.

This embodiment divides the living space by a storage wall to provide areas for different functions.

Embodiment 7

Figure 13:
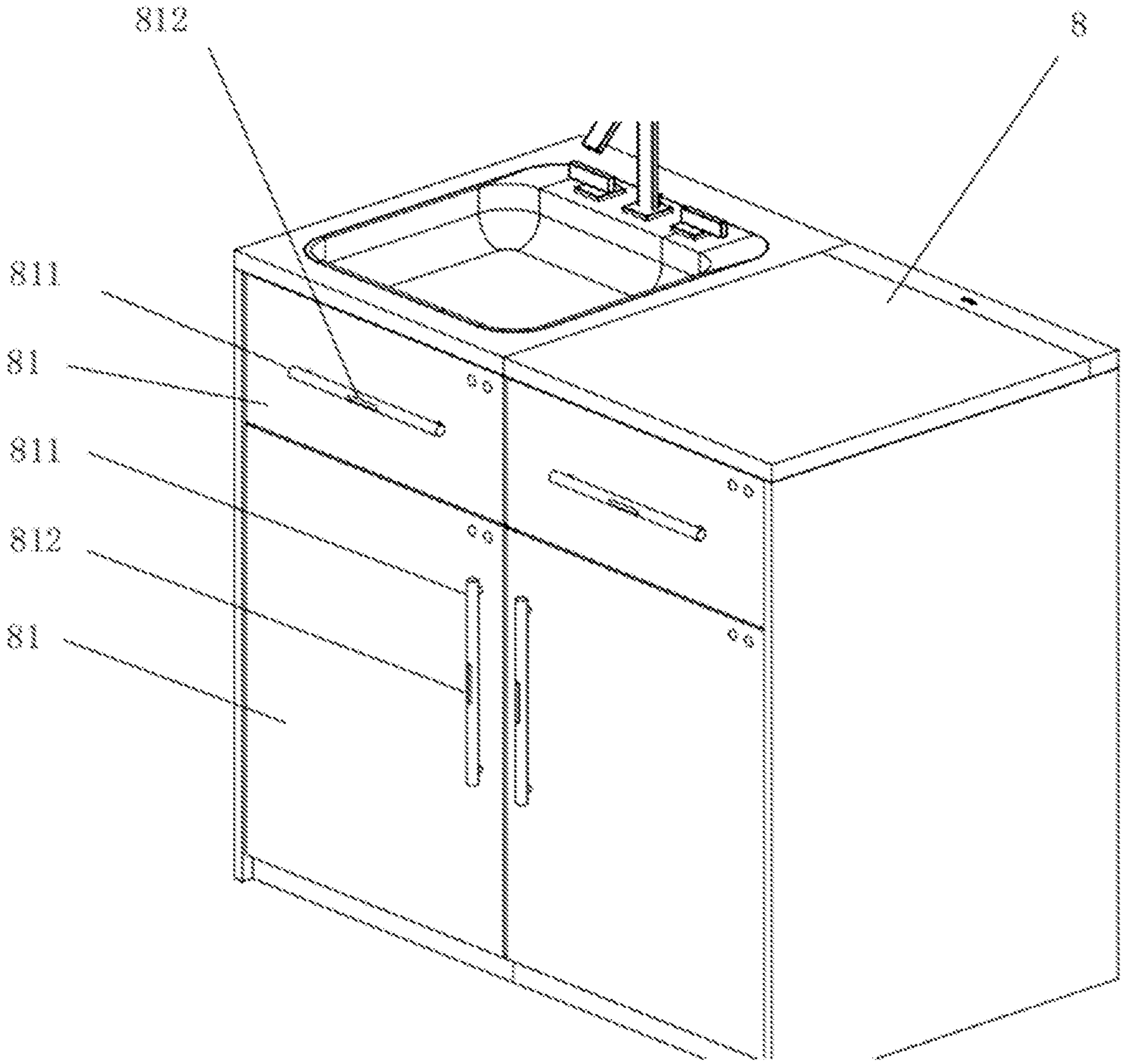
FIG. 13 is a schematic diagram of a cabinet of the seventh embodiment of the application.

A schematic diagram of a cabinet of a seventh embodiment of the application is shown in FIG. 13, which comprises: a seventh cabinet body 8, wherein the seventh cabinet body 8 is provided with a second storage cabinet 81, the second storage cabinet 81 is provided with a second storage cabinet handle 811, and the second storage cabinet handle 811 is provided with a first handle light emitting device 812.

Specifically, the second storage cabinet 81 may be any kind of storage cabinet, such as drawers or hinged storage cabinets. The second storage cabinet 81 is provided with the second storage cabinet handle 811, for opening or closing the second storage cabinet 81. The second storage cabinet handle 811 is provided with the first handle light emitting device 812. The first handle light emitting device 812 may be any kind of light fixture. The first handle light emitting device 812 is fixedly connected to or built into the second storage cabinet handle 811.

Figure 14:
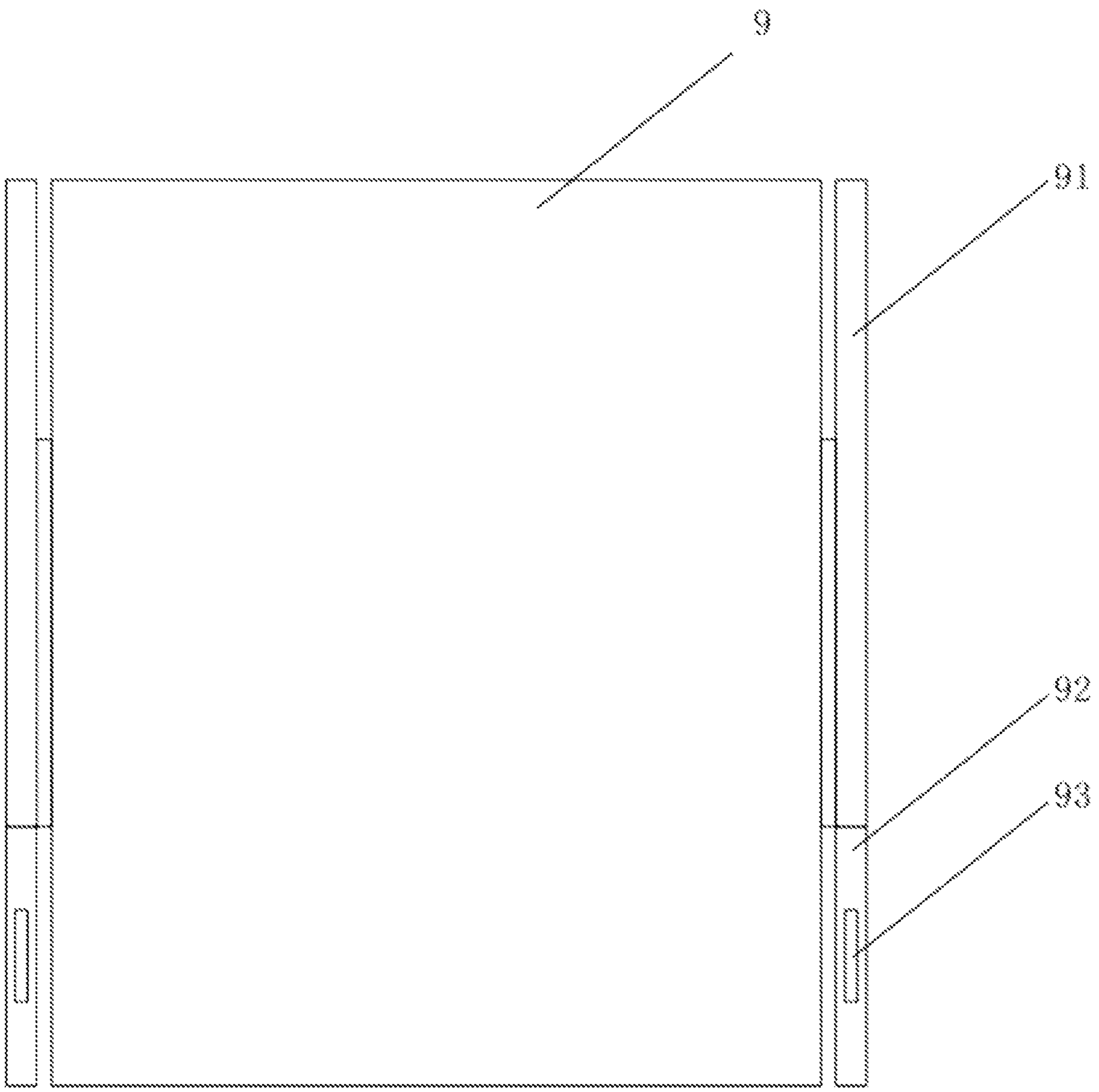
FIG. 14 is a schematic diagram of a mirror of the seventh embodiment of the application.

A schematic diagram of a mirror of the seventh embodiment of the application is shown in FIG. 14, which comprises: a second mirror face 9, a second mirror face guiding rail 91, and a second mirror face handle 92, wherein the second mirror face 9 is connected to the second mirror face guiding rail 91 and capable of sliding along the second mirror face guiding rail 91, the second mirror face handle 92 is fixedly connected to the second mirror face 9, and the second mirror face handle 92 is provided with a second handle light emitting device 93.

Specifically, the second mirror face 9 moves along the second mirror face guiding rail 91 and the user adjusts the height of the second mirror face 9 by holding the second mirror face handle 92. The second mirror face handle 92 may be provided on one or both sides of the second mirror face 9. The second mirror face handle 92 is provided with the second handle light emitting device 93. The second handle light emitting device 93 may be any kind of light fixture. The second handle light emitting device 93 is fixedly connected to the second mirror face handle 92 or built into the second mirror face handle 92. The second mirror face 9 may be mounted on the mirror cabinet.

This embodiment provides light emitting device on the handle to help the user determine the position of the handle on the one hand, and make the cabinet and mirror more beautiful on the other hand.

Embodiment 8

Figure 15:
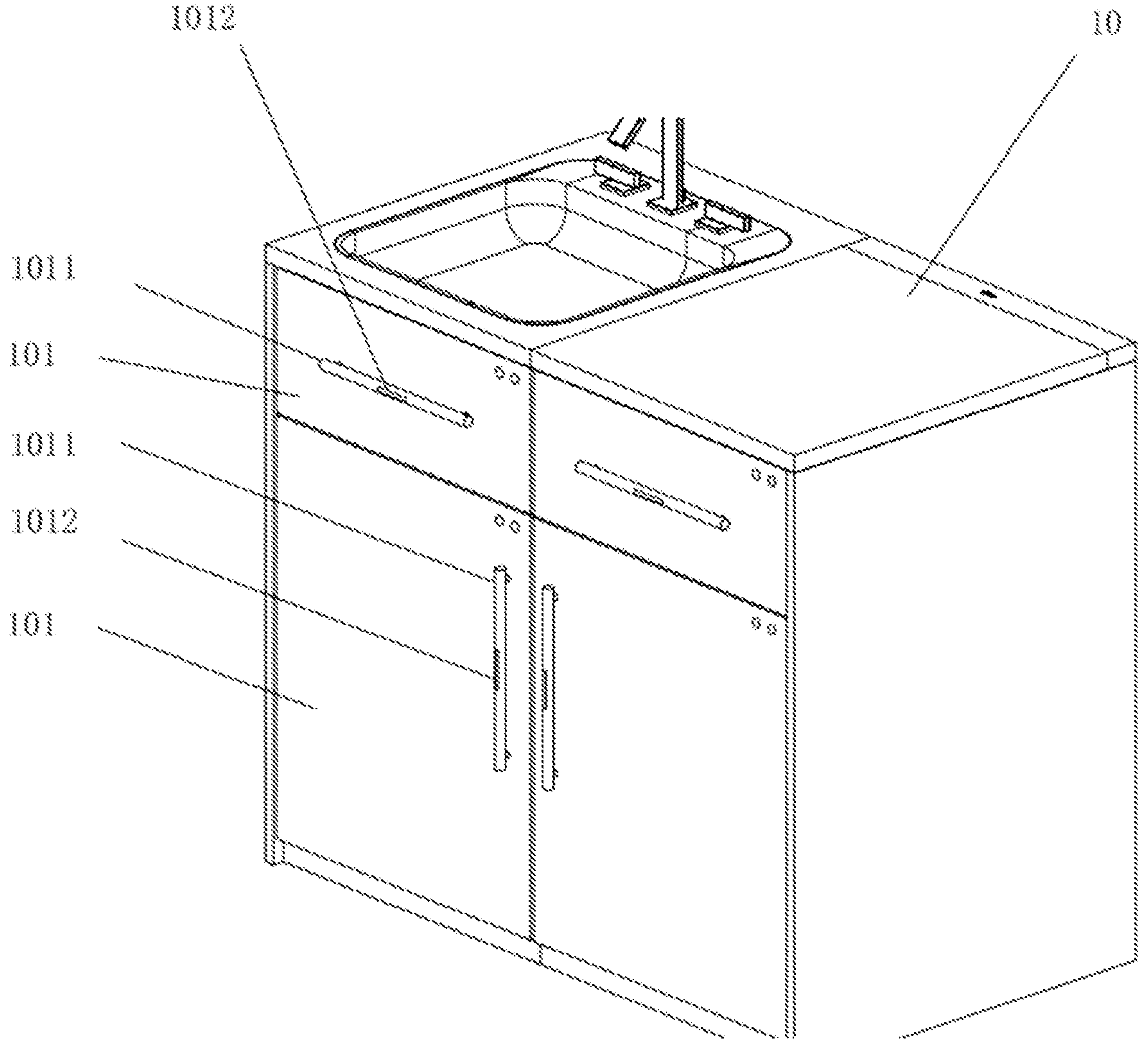
FIG. 15 is a schematic diagram of a cabinet of the eighth embodiment of the application.

A schematic diagram of a cabinet of the eighth embodiment of the application is shown in FIG. 15, which comprises: an eighth cabinet body 10, wherein the eighth cabinet body 10 is provided with a third storage cabinet 101, the third storage cabinet 101 is provided with a third storage cabinet handle 1011, and the third storage cabinet handle 1011 provided with a first health information sensor 1012.

Specifically, the third storage cabinet 101 may be any kind of storage cabinet, such as drawers or hinged storage cabinets. The third storage cabinet 101 is provided with the third storage cabinet handle 1011, for opening or closing the third storage cabinet 101. The first health information sensor 1012 is provided on the third storage cabinet handle 1011. The first health information sensor 1012 may be a single sensor, comprises but not limited to: a body temperature sensor, a heart rate sensor, and other similar health information sensors. The first health information sensor 1012 may also be an integrated sensor, i.e., capable of detecting body temperature, heart rate, and other similar health information. The detected information from the first health information sensor 1012 may be connected to a software system to determine abnormalities and communicate. The detected information may be provided to the user, for example, via a mobile device to the user. The first health information sensor 1012 is fixedly connected to or built into the third storage cabinet handle 1011.

Figure 16:
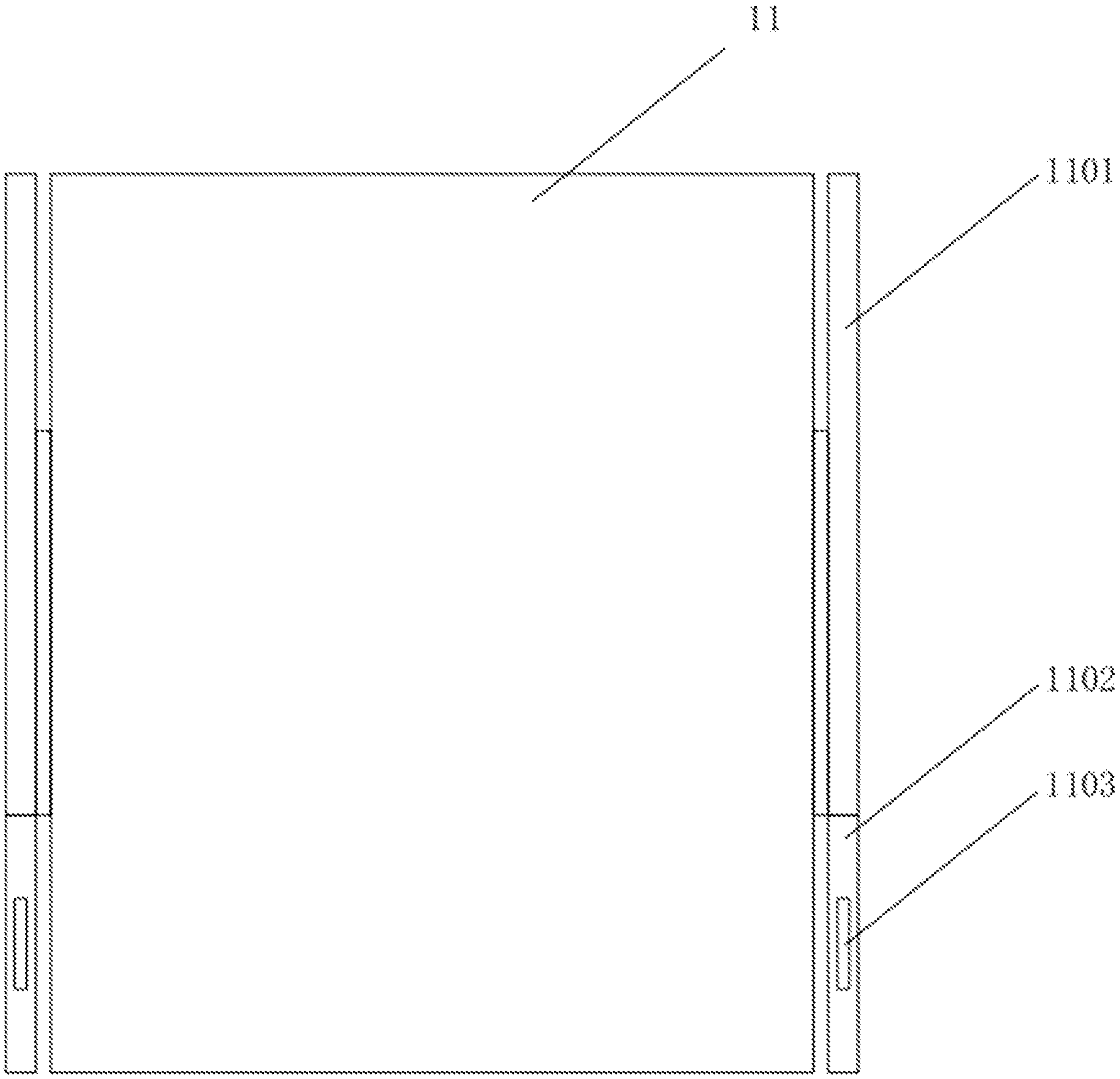
FIG. 16 is a schematic diagram of a mirror of the eighth embodiment of the application.

A schematic diagram of a mirror of the eighth embodiment of the application is shown in FIG. 16, which comprises: a third mirror face 11, a third mirror face guiding rail 1101, and a third mirror face handle 1102, wherein the third mirror face 11 is connected to the third mirror face guiding rail 1101 and capable of sliding along the third mirror face guiding rail 1101, the third mirror face handle 1102 is fixedly connected to the third mirror face 11, the third mirror face handle 1102 is provided with a second health information sensor 1103.

The third mirror face 11 moves along the third mirror face guiding rail 1101, and the user adjusts the height of the third mirror face 11 by holding the third mirror face handle 1102. The third mirror face handle 1102 may be provided on one or both sides of the third mirror face 11. The second health information sensor 1103 is provided on the third mirror face handle 1102. The second health information sensor 1103 may be a single sensor, comprises but not limited to: a body temperature sensor, a heart rate sensor, and other similar health information sensors. The second health information sensor 1103 may also be an integrated sensor, i.e., capable of detecting body temperature, heart rate, and other similar health information. The detected information from the second health information sensor 1103 may be connected to a software system to determine abnormalities and communicate. The detected information may be provided to the user, for example, via a mobile device to the user. The second health information sensor 1103 is fixedly connected to or built into the third mirror face handle 1102. The third mirror face 11 may be mounted on a mirror cabinet.

This embodiment provides a health information sensor that can detect monitoring information about the user when the user opens or closes the storage cabinet by the handle or when the user adjusts the mirror face by the handle, thereby providing health surveillance for the user.

Embodiment 9

Figure 17:
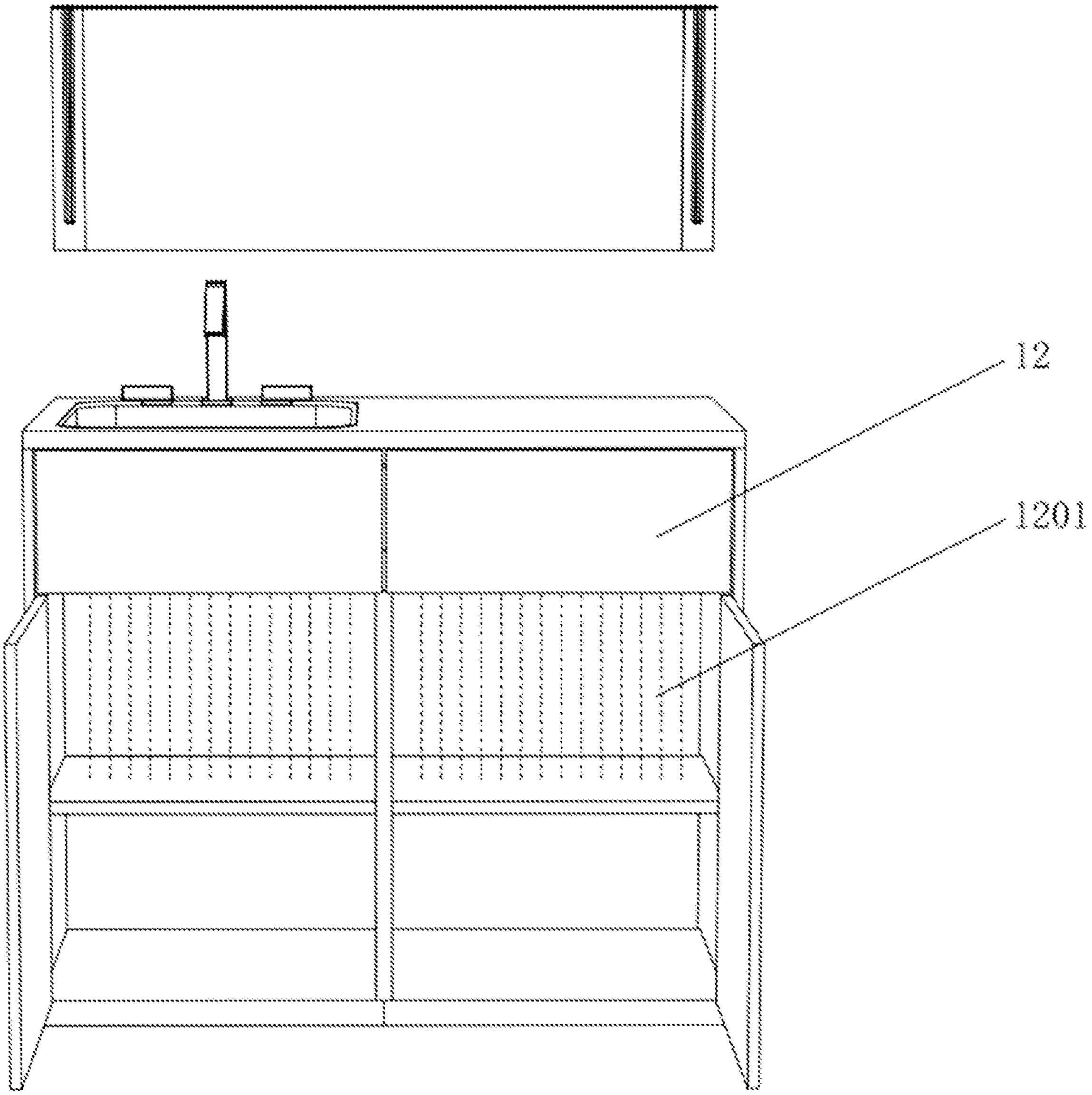
FIG. 17 is a schematic diagram of a cabinet of the ninth embodiment of the application.

A schematic diagram of a cabinet of the ninth embodiment of the application is shown in FIG. 17, which comprises: a ninth cabinet body 12 and a cabinet body heating device 1201 fixed to the ninth cabinet body 12.

Specifically, the cabinet body heating device 1201 is any kind of heating device, such as infrared heater. The cabinet body heating device 1201 may be integrated into the ninth cabinet body 12. For example, it is placed in the storage cabinet of the ninth cabinet body 12. The cabinet body heating device 1201 may be used to heat towels placed within the cabinet or to dry other fabrics.

Figure 18:
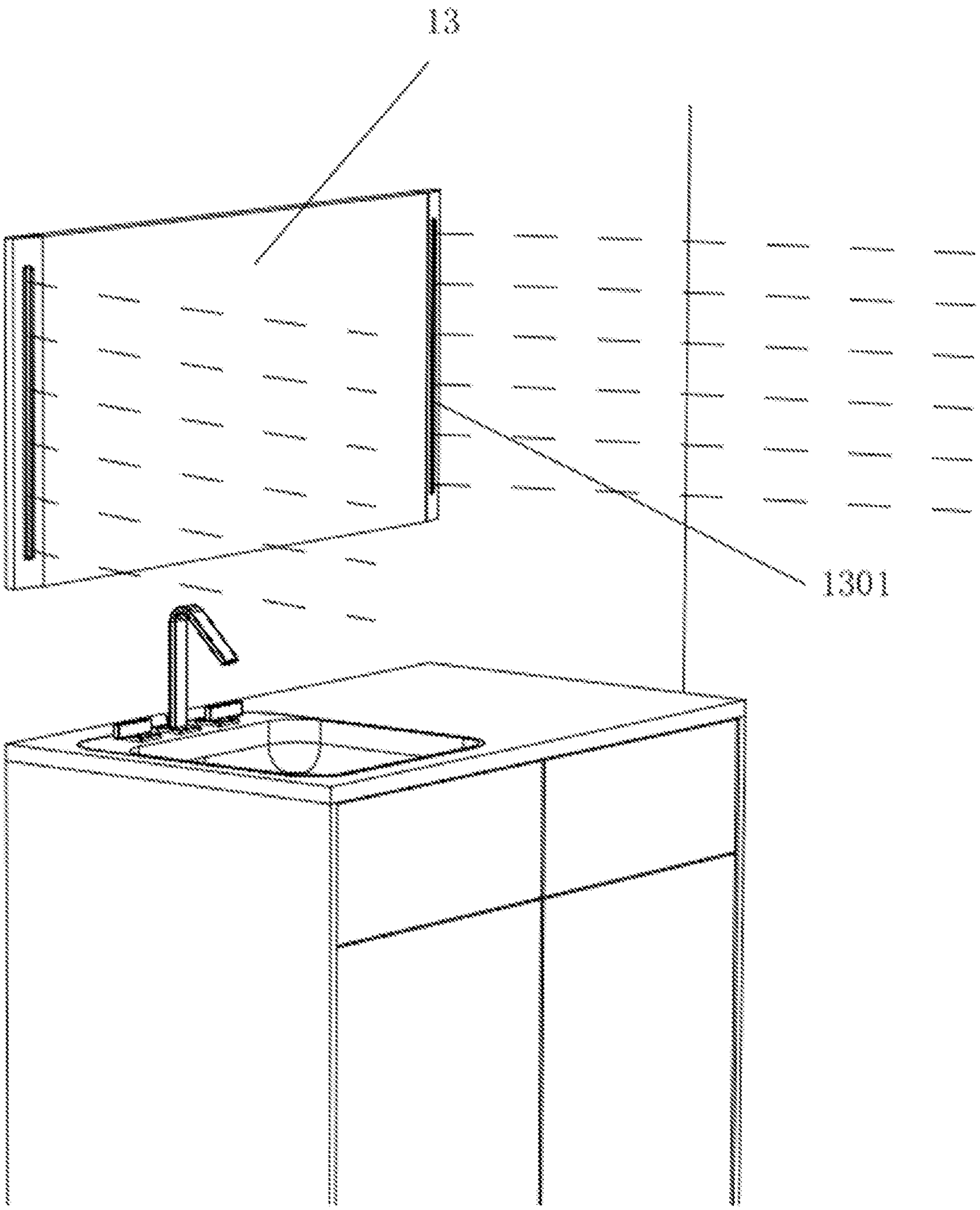
FIG. 18 is a schematic diagram of a mirror of the ninth embodiment of the application.

A schematic diagram of a mirror of the ninth embodiment of the application is shown in FIG. 18, which comprises: a fourth mirror face 13 and a mirror face heating device 1301 fixedly connected to the fourth mirror face 13.

Specifically, the mirror face heating device 1301 is any kind of heating device, such as infrared heaters. The mirror face heating device 1301 may be provided on both sides of the fourth mirror face 13, and additionally may be provided on a top or bottom of the fourth mirror face 13. The mirror face heating device 1301 may provide warmth to the user in the bathroom vanity, which is suitable for the short stay of the user in the bathroom in winter.

This embodiment adds heating devices to the cabinet and mirror face to heat clothing or provide warmth for the user.

Embodiment 10

Figure 19:
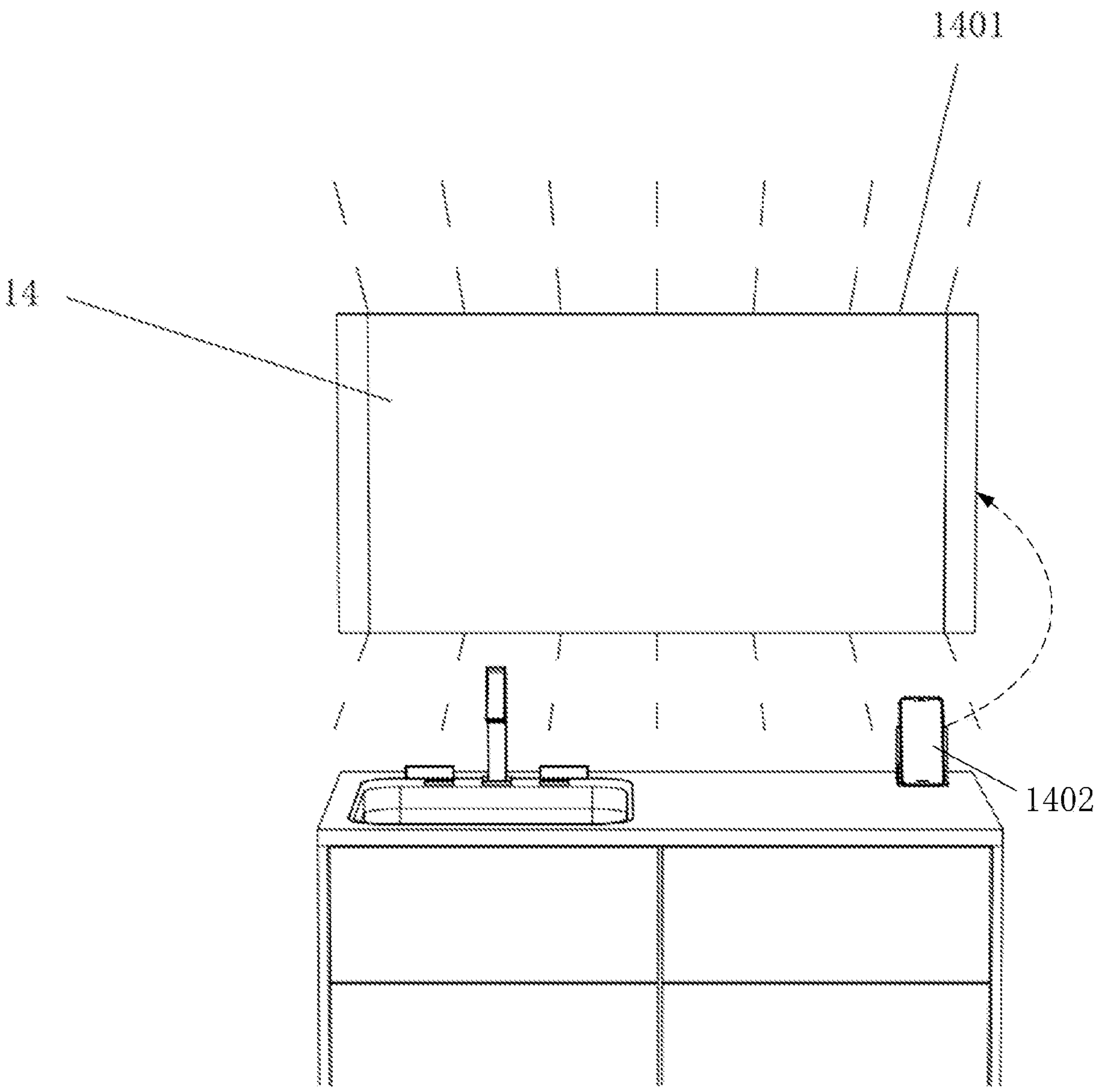
FIG. 19 is a schematic diagram of a mirror of the tenth embodiment of the application.

A schematic diagram of a mirror of a tenth embodiment of the application is shown in FIG. 19, which comprises: a fifth mirror face 14, a fifth mirror face light emitting device 1401, an audio capture device, and a third controller, wherein an output end of the audio capture device is communicatively connected to an input end of the third controller, an output end of the third controller is communicatively connected to the fifth mirror face light emitting device 1401, and the third controller controls lighting parameters of the fifth mirror face light emitting device 1401 according to an audio signal captured by the audio capture device.

Specifically, the fifth mirror face light emitting device 1401 is provided on the fifth mirror face 14. The fifth mirror face light emitting device 1401 may be any kind of light fixture. For example, a sidelight device is arranged on both sides of the fifth mirror face 14, or a backlight device is arranged behind the fifth mirror face 14. The light parameters of the fifth mirror face light emitting device 1401 comprise but are not limited to: on, off, light color, light brightness, luminous frequency, etc.

The audio capture device comprises, but is not limited to, a sound receiving device or a communication receiving device. The sound receiving device may be a microphone, through which the sound played in the environment is captured and sent to the third controller, which controls the lighting parameters of the fifth mirror face light emitting device 1401 according to the captured sound. For example, the light color is changed according to the music frequency.

The communication receiving device may be a Bluetooth, WIFI receiving device. The communication receiving device is communicatively connected to a nearby smart terminal 1402, obtains the sound played in the smart terminal 1402, and sends it to the third controller, which controls the light parameters of the fifth mirror face light emitting device 1401 according to the captured sound. For example, the light color, change frequency, light brightness is changed according to the music frequency. The smart terminal 1402 may be a terminal device such as a cell phone, a computer, a tablet computer, etc.

The specific control relationship between the lighting parameters and sound may be set and saved by the user to adapt to user habits, for example, the relationship between the change range and the change frequency of light color, and the light brightness and music frequency. It may provide 360 degrees of color control for each color.

The mirror face light of this embodiment may be changed according to the environment music, which provides a more favorable environment atmosphere and better experience and is more suitable for young people.

Embodiment 11

Figure 20:
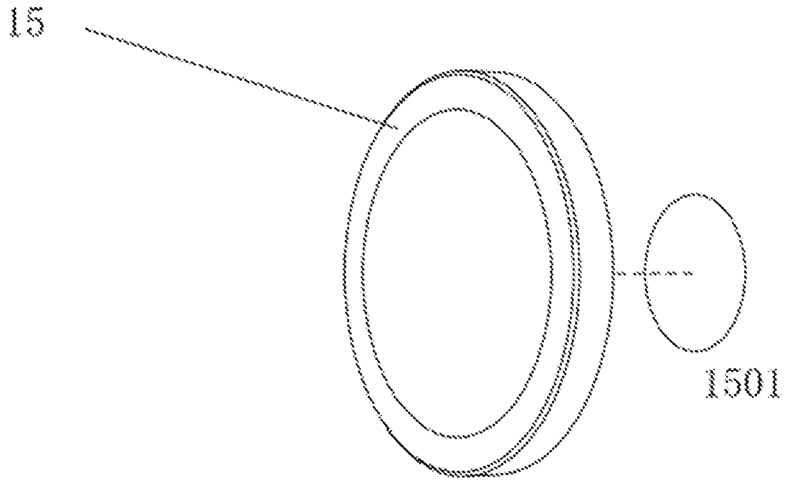
FIG. 20 is a schematic diagram of a portable light fixture of the eleventh embodiment of the application.

A schematic diagram of a portable light fixture of the eleventh embodiment of the application is shown in FIG. 20, which comprises: a light source 15 and an attachment device 1501 fixedly connected to the light source 15.

Figure 21:
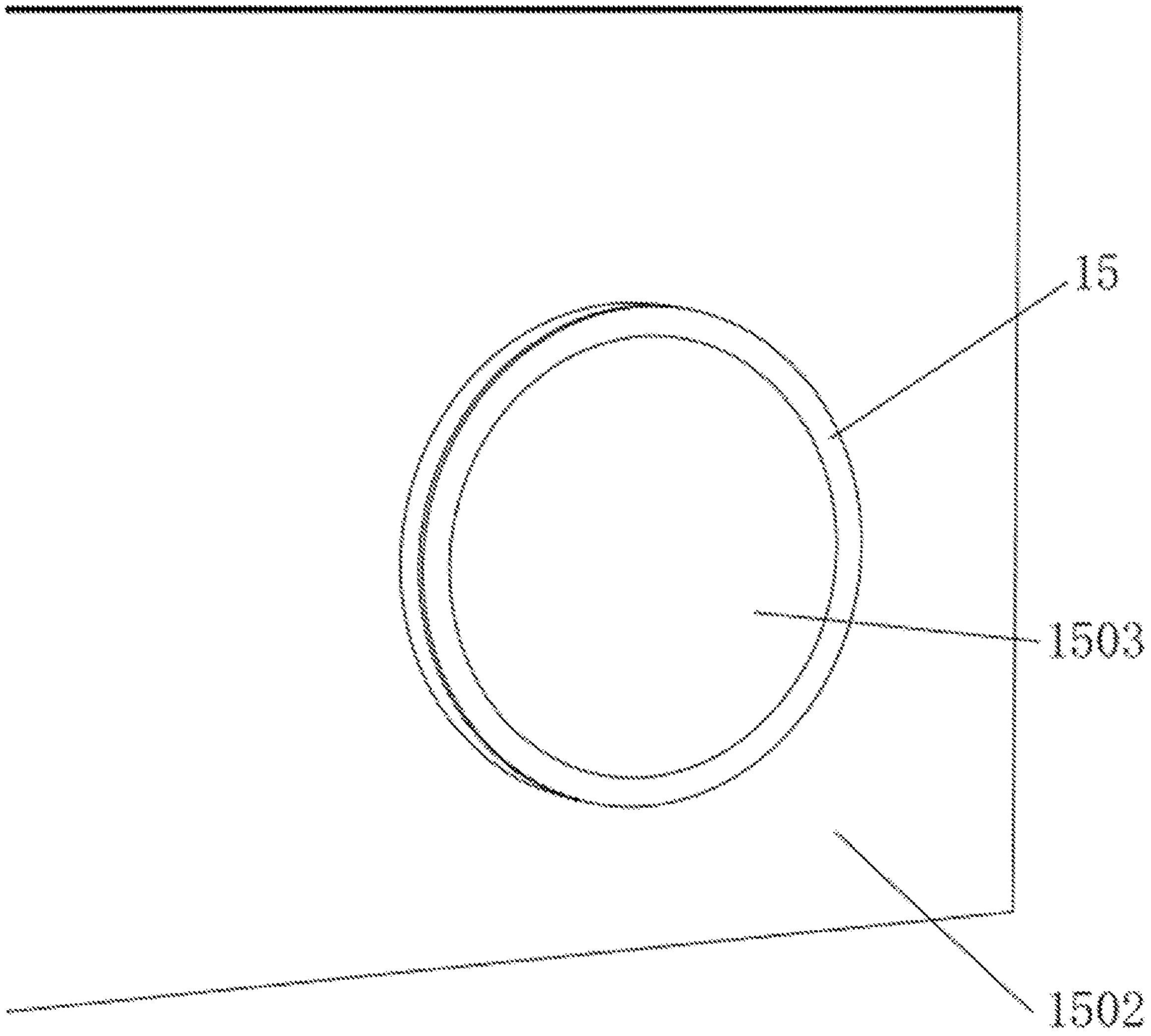
FIG. 21 is an application schematic diagram of a portable light fixture of the eleventh embodiment of the application.

Specifically, the light source 15 comprises a light emitting device and a power supply battery, the power supply battery may be a disposable battery or a rechargeable battery. Attachment device 1501 may be suction cups, magnets, or repeatable adhesive device. As shown in FIG. 21, the attachment device 1501 attaches the portable light fixture to a mirror face or mirror cabinet, such as to the mirror face 1502, thereby providing light to the mirror face 1502 for user to makeup The portable light fixture may also comprise Internet of Things (IoT) functionality.

In one of the embodiments, a communication device and a controller are further comprised, the communication device is communicatively connected to the controller, and the controller is communicatively connected to the light source 15. The communication device receives control from, for example, the application of a mobile phone. The user may change the color of the light through the application of the mobile terminal, and the mobile terminal may also obtain the light intensity, time, etc. through the communication device.

Figure 22:
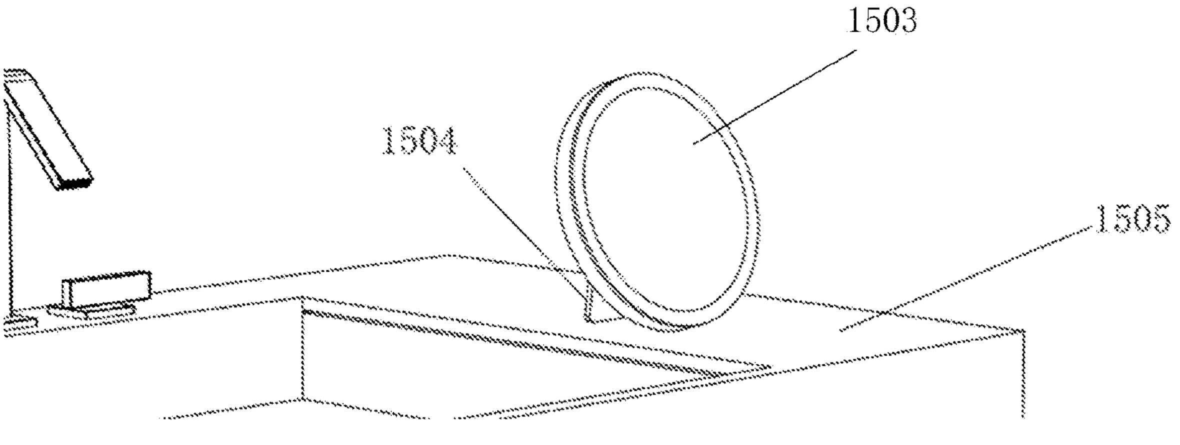
FIG. 22 is another application schematic diagram of another application of a portable light fixture of the eleventh embodiment of the application.

In one of the embodiments, the portable light fixture further comprises: a portable mirror face 1503, and a folding bracket 1504 fixedly connected to the portable mirror face 1503, and/or the portable mirror face 1503 is fixedly connected to the attachment device 1501, and the portable mirror face 1503 is fixedly connected to the light source 15, for example, the light source 15 is provided around the portable mirror face 1503. The folding bracket 1504 may be folded when the portable light fixture is attached to the mirror face 1502. As shown in FIG. 22, the folding bracket 1504 may be unfolded when the portable light fixture is placed on a flat surface, such as a cabinet body 1505.

This embodiment provides portable light fixture to easily attach to a mirror face or mirror cabinet to provide an additional light source for the mirror face or mirror cabinet.

Embodiment 12

Figure 23:
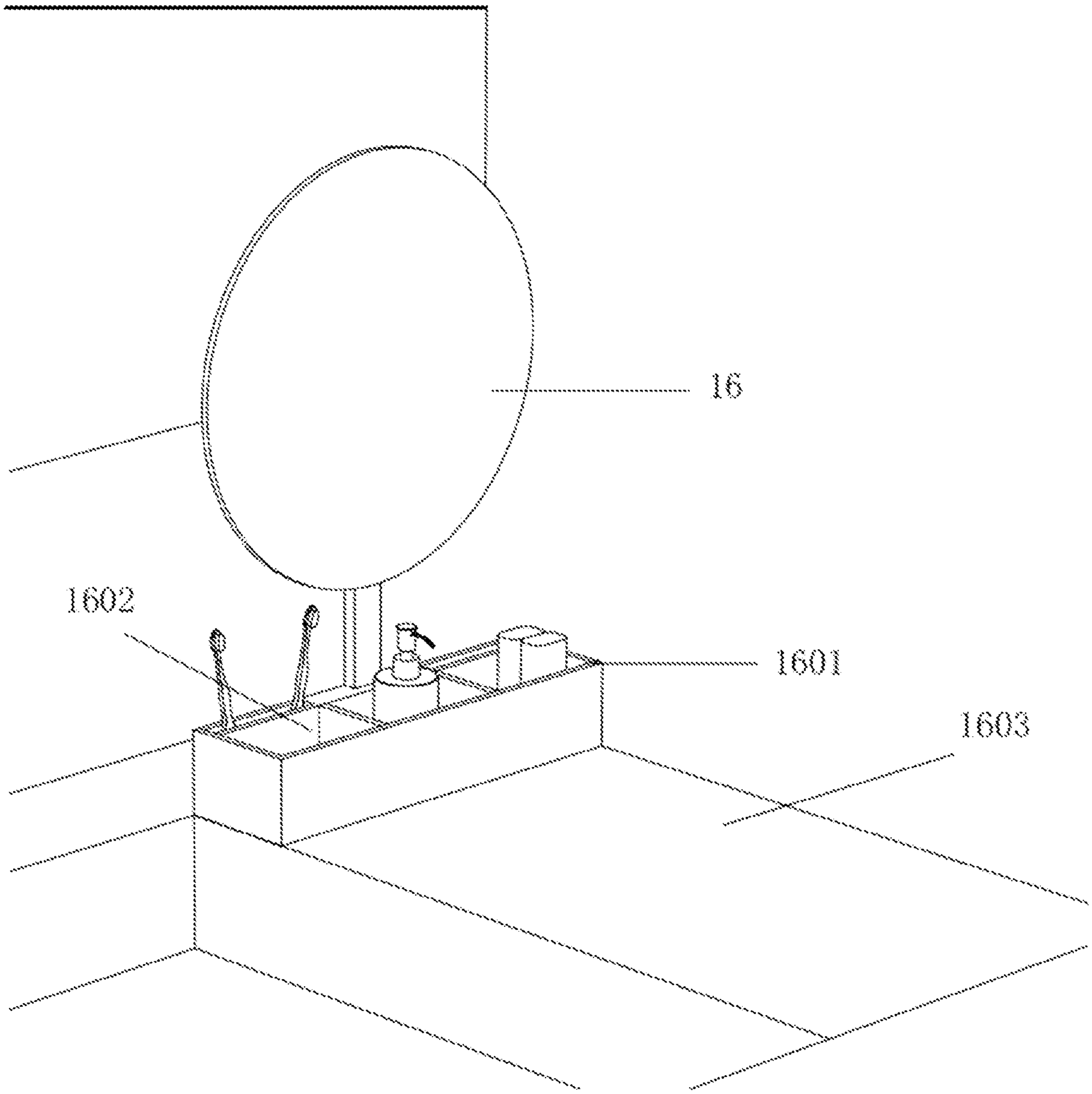
FIG. 23 is a schematic diagram of a mirror of the twelfth embodiment of the application.

A schematic diagram of a mirror of the twelfth embodiment of the application is shown in FIG. 23, which comprises: a sixth mirror face 16 and a mirror face bracket 1601 fixedly connected to the sixth mirror 16, the mirror bracket 1601 being provided with one or more storage compartment 1602.

Specifically, the mirror face bracket 1601 of this embodiment is provided with storage compartment 1602 for placing various small items needed by the user to facilitate the user's organization. The sixth mirror face 16 and the mirror face bracket 1601 are an integrated dressing table with a mirror, which is space-saving and easy to carry. The mirror face bracket 1601 may be placed on the cabinet body 1603 in use.

In one of the embodiments, it also comprises a light source, a sensor, and a controller, the sensor is communicatively connected to the controller, and the controller is communicatively connected to the light source. The light source comprises a light emitting device and a power supply battery, and the power supply battery may be a disposable battery or a rechargeable battery. The sixth mirror face 16 is fixedly connected to the light source, for example, the light source is provided around the sixth mirror face 16.

The sensor is preferably a proximity sensor, such as an infrared sensor. The controller controls the light source to turn on or off based on the information from the proximity sensor. For example, the light source is turned on when the user is detected to be approaching, and turned off when the user is detected to be leaving.

This embodiment provides a mirror that provides storage space, which save space and ease to carry.

Embodiment 13

Figure 24:
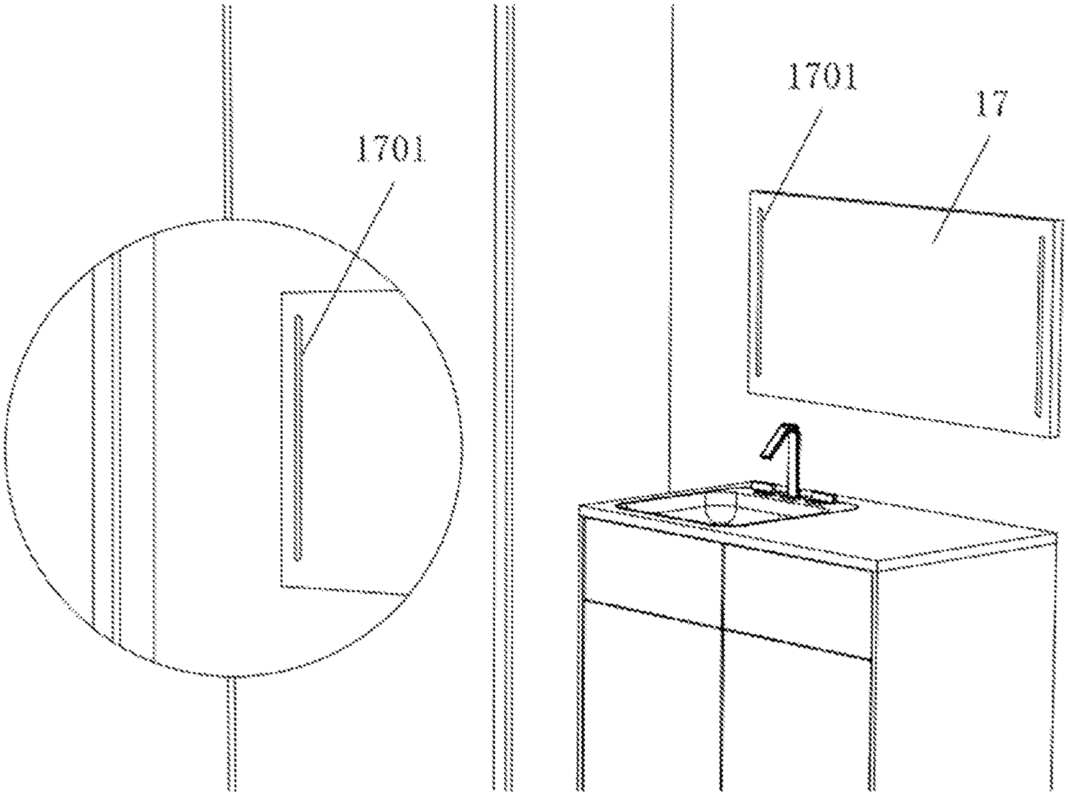
FIG. 24 is a schematic diagram of a mirror of the thirteenth embodiment of the application.

A schematic diagram of a mirror of the thirteenth embodiment of the application is shown in FIG. 24, which comprises: a seventh mirror face 17, a mirror face environment sensor, and a fourth controller, wherein the seventh mirror face 17 is provided with a seventh mirror face light emitting device 1701, an output end of the mirror face environment sensor is communicatively connected to an input end of the fourth controller, an output end of the fourth controller is communicatively connected to the seventh mirror face light emitting device 1701, and the fourth controller controls lighting parameters of the seventh mirror face light emitting device 1701 according to the environmental information from the mirror environment sensor.

Specifically, the light parameters of the seventh mirror face light emitting device 1701 comprise but are not limited to: on, off, light color, light brightness, luminous frequency, etc. The mirror face environment sensor detects environmental information in the vicinity of the mirror face. The mirror face environment sensor comprises, but is not limited to, cameras, light sensors, communication devices, etc.

The fourth controller controls the light parameters of the seventh mirror face light emitting device 1701 based on the environmental information obtained by the mirror face environmental sensor, so that the color, and/or brightness of the light emitted by the seventh mirror face light emitting device 1701 is consistent with or close to the color and/or brightness corresponding to the obtained environmental parameters. The environmental parameters comprise, but are not limited to: weather, current time in a day, current time in a year, environment brightness, and environment color.

Current weather comprises, but is not limited to: sunny, cloudy, and rainy. The current time in a day comprises, but is not limited to: daytime, afternoon, dusk, and night. The current time in a year comprises, but is not limited to: spring, summer, fall, winter. For example, the current weather, environment brightness, environment color, etc. may be acquired through the camera. The environment brightness, environment color, etc. may be acquired through the light sensor. The weather, current time in a day, current time in a year, etc. may be obtained through the communication device. The color and/or brightness corresponding to the environmental parameters may be set in advance.

In one of the embodiments, the seventh mirror face 17 is fixed to the mirror cabinet, and the mirror cabinet is provided with a humidity sensor, a controller, and a heating device. When the humidity exceeds a preset value, the controller controls the heating device to start heating.

In one of the embodiments, the seventh mirror face 17 is also provided with a display device, the mirror cabinet is also provided with a temperature sensor, and the display device displays the detected temperature and humidity.

This embodiment adds an adaptive grooming illuminating system in the mirror to achieve detection of the state of the environment light and automatically adjust the illumination to the most appropriate configuration. It allows the user to have the best illumination assistance at any time, no matter day, night, clear sky, cloudy sky, or when the overhead lights are on or off. The user may have the best illumination effect once the front light and the like of the mirror is turned on.

Embodiment 14

Figure 25:
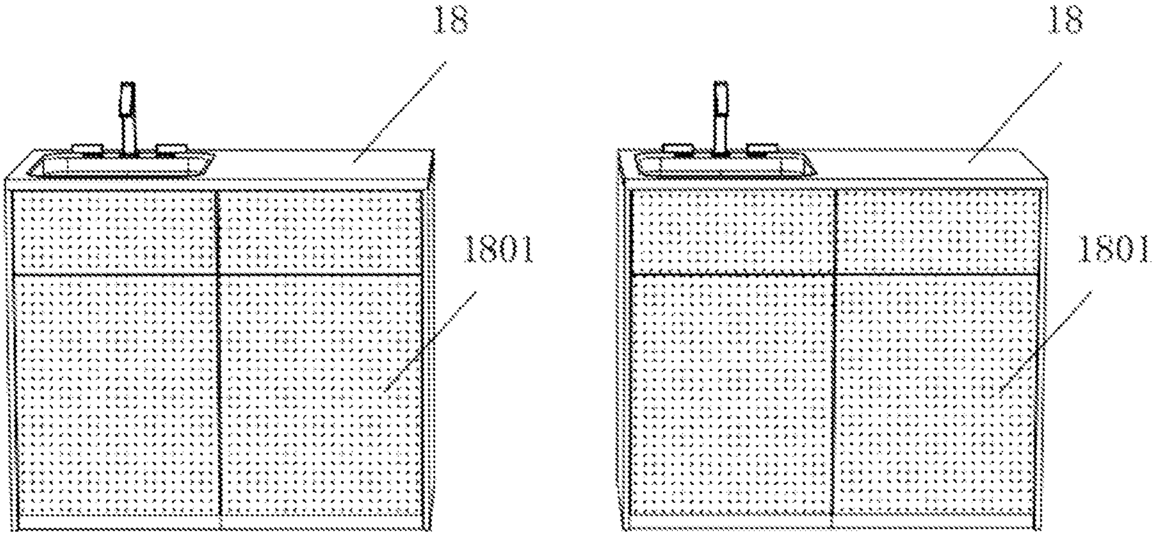
FIG. 25 is a schematic diagram of a cabinet of the fourteenth embodiment of the application.

A schematic diagram of a cabinet of the fourteenth embodiment of the application is shown in FIG. 25, which comprises: a tenth cabinet body 18 and a fifth controller, wherein the tenth cabinet body 18 is provided with an illuminating panel 1801, the fifth controller is communicatively connected to the illuminating panel 1801 to control display parameters of the illuminating panel 1801.

Specifically, the illuminating panel 1801 may be a decorative panel, an environment illuminating panel, a cabinet door, or a drawer of the tenth cabinet body 18. The illuminating panel 1801 is formed by integrating the illuminating function on the decorative panel, the environment illuminating panel, the cabinet door, or the drawer.

The illuminating panel 1801 may be implemented by using a Light-Emitting Diode (LED) panel or an e-ink panel, such as applying e-ink to a plastic film that is an element of the panel.

The illuminating panel of this embodiment emits lights that may be changed to suit the needs of the user. And it may be a design feature to decorate a vanity or bathroom.

Embodiment 15

Figure 26:
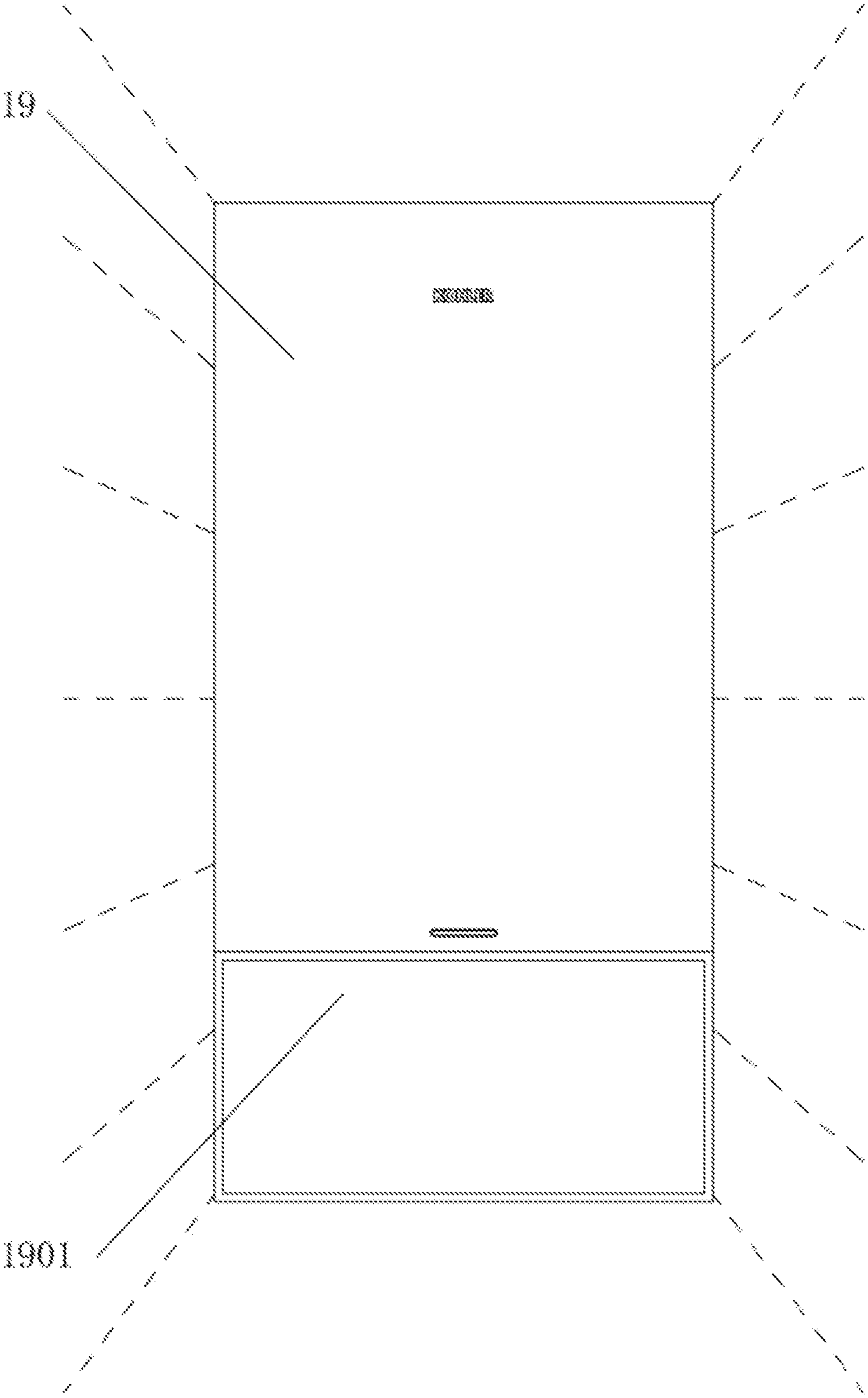
FIG. 26 is a schematic diagram of a mirror of the fifteenth embodiment of the application.
Figure 27:
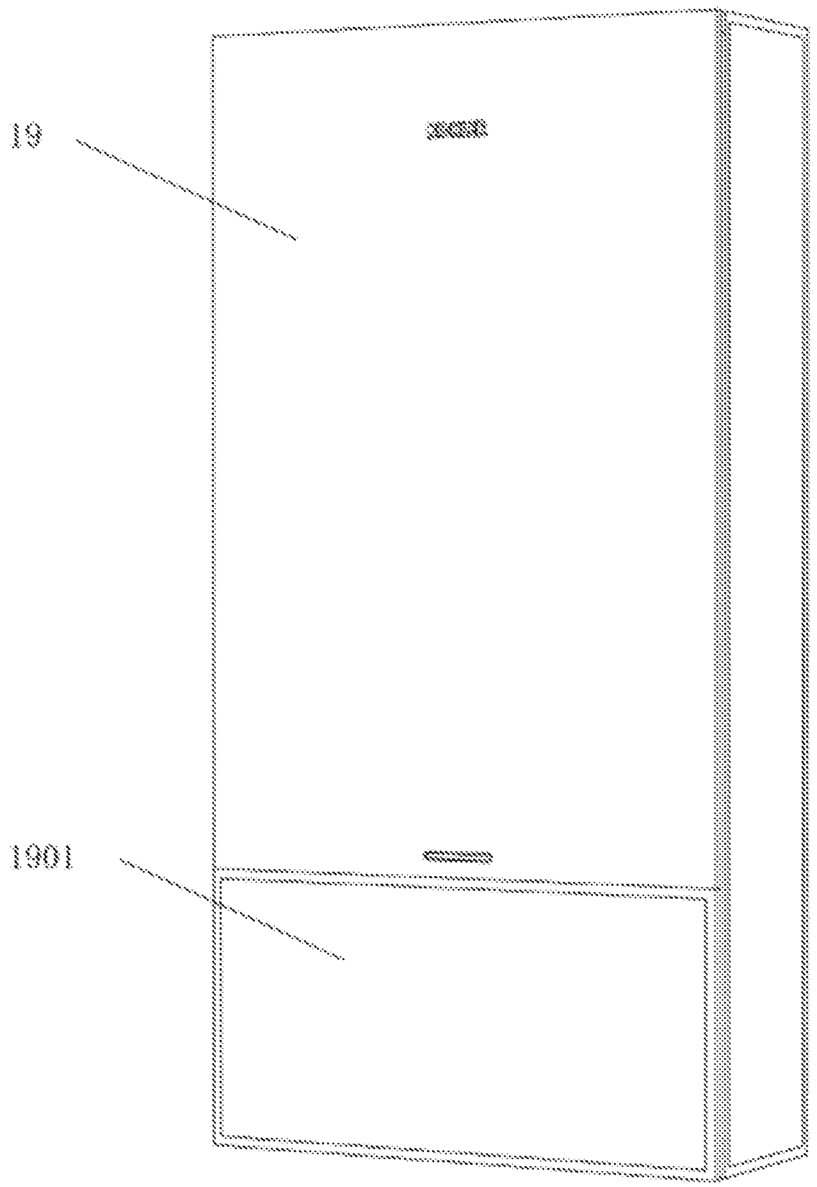
FIG. 27 is a schematic diagram of a mirror of the fifteenth embodiment of the application, from another view.

A schematic diagram of a mirror of the fifteenth embodiment of the application is shown in FIGS. 26 and 27, which comprises: an eighth mirror face 19, a radio device 1901, a sixth controller, and a display device fixedly connected to the eighth mirror face 19, wherein an output end of the radio device is communicatively connected to an input end of the sixth controller, and an output end of the sixth controller is communicatively connected to the display device.

Specifically, this embodiment integrates a karaoke function in the mirror. It may be integrated with lights, music, or ambient light. Wherein, the display device may be a light display device and/or a display screen.

The controller receives the user's singing voice through the radio device and controls the display device to show the corresponding light, text, or pattern, etc.

Preferably, the display device is mounted on a back and/or side of the eighth mirror face 19 to display lights according to the control of the controller, and the lights are synchronized with the singing voice to enhance the karaoke experience. The ambient lights on both sides are projected on the wall during singing.

In one of the embodiments, an announcing device is also comprised.

Specifically, the announcing device may be integrated with the radio device or set up separately.

Preferably, the radio device is a microphone and the announcing device is a speaker. The microphone detects the user's singing voice and automatically amplifies the user's voice on the speaker.

Bathroom is a private space and people like to sing in the bathroom. The karaoke mirror of this embodiment integrates a blend of dynamic true color lights in music playback and releases ambient lights. This embodiment integrates projection of lights and lyrics while the user sings, as well as other content, such as weather, news, stocks, etc.

Users may get scores for each song when they are using karaoke function. At the same time, it may be controlled by sound and gestures.

In one of the embodiments, an aroma supply device may also be added to the eighth mirror face 19 to provide sound, visual as well as aroma and provide a good experience for the user.

In one of the embodiments, the eighth mirror face 19 is mounted on a mirror cabinet.

The above described embodiments only express several embodiments of the application, and their descriptions are more specific and detailed, but they are not to be understood as a limitation of the scope of the patent application. It should be pointed out that, for those of ordinary skills in the art, several other modifications and improvements may be made on the basis of the principle of the application, which should also be regarded as falling in the protection scope of the application. Therefore, the protection scope of the present patent application shall be subject to the appended claims.

FURTHER EMBODIMENTS

Figure 28B:
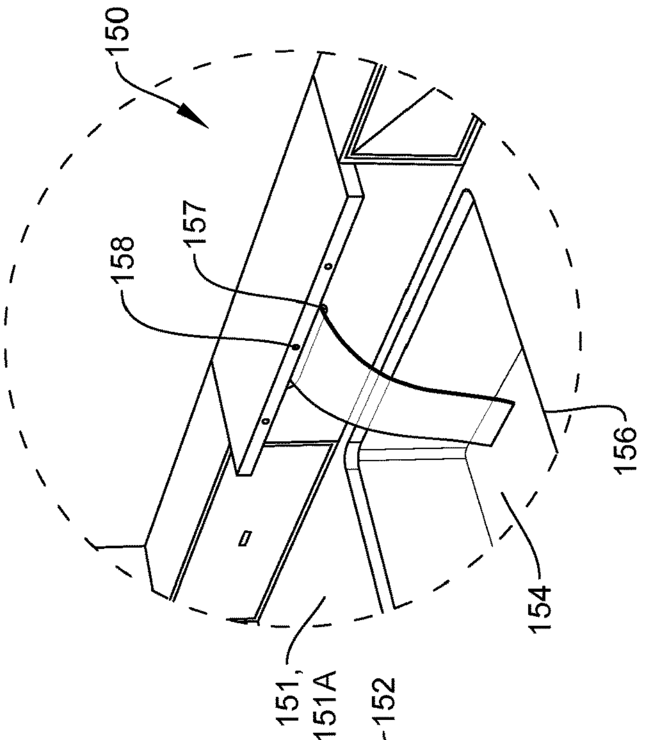
FIGS. 28A-B are schematic diagrams of a cabinet according to another embodiment.
Figure 28A:
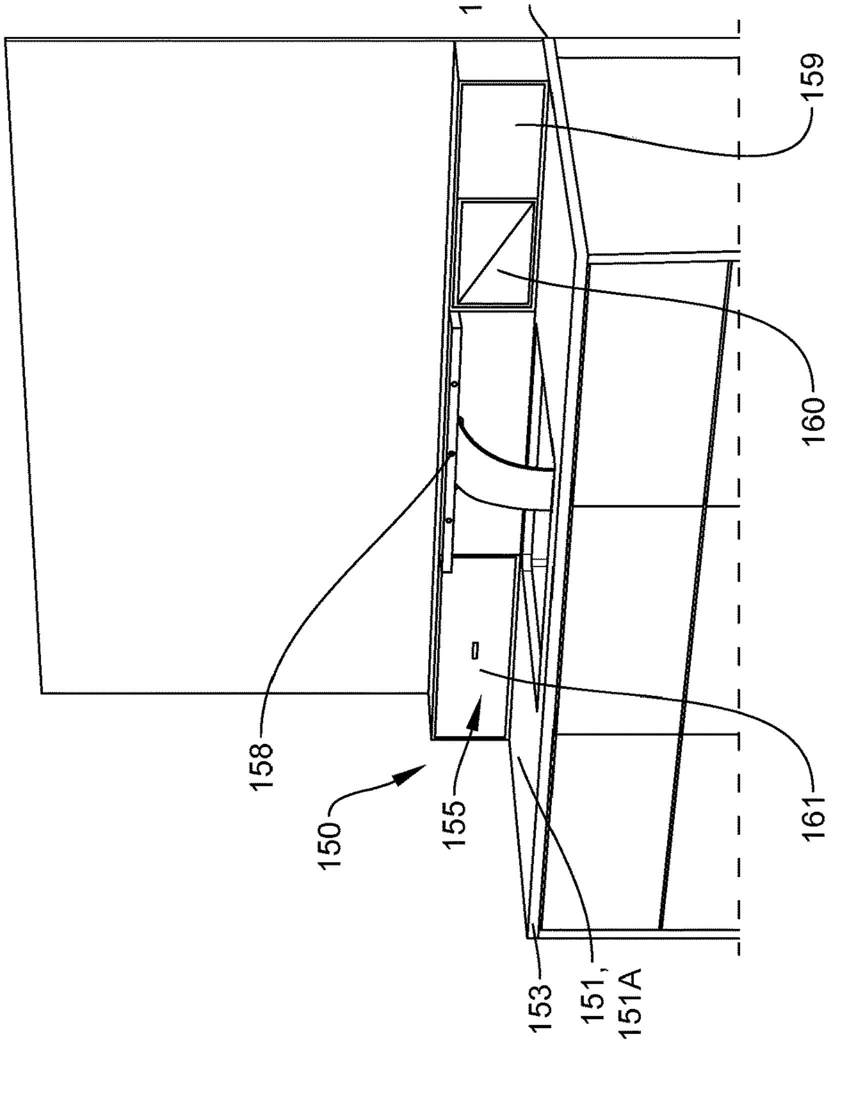

FIGS. 28A-B are schematic diagrams of a cabinet according to another embodiment. The cabinet 150 includes a countertop 151 having front edge 153 and a rear edge 152, a basin 154 having an opening 156 surrounded by the countertop 151, a backsplash structure 155 positioned between the basin opening 156 and the rear edge 152 of the countertop 151, the backsplash structure 155 housing at least a portion of a faucet 157. The backsplash structure may house a number of items, including a touchless sensor 158 or other sensor to control a release of water by the faucet, a storage area 159 (which may be closed or open), an area 160 and/or circuits to receive a smartphone, tablet, or other smart device, or a housing 161 for a speaker.

Figure 29B:
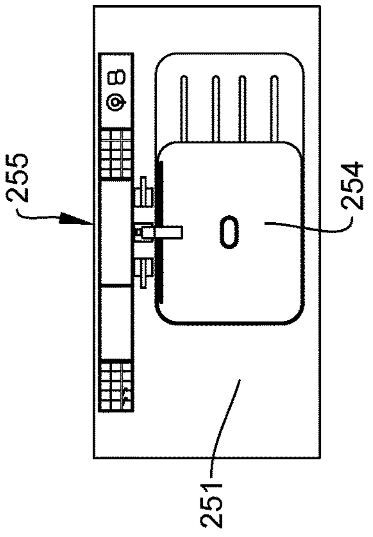
FIGS. 29A-C are schematic diagrams of a cabinet according to another embodiment.
Figure 29C:
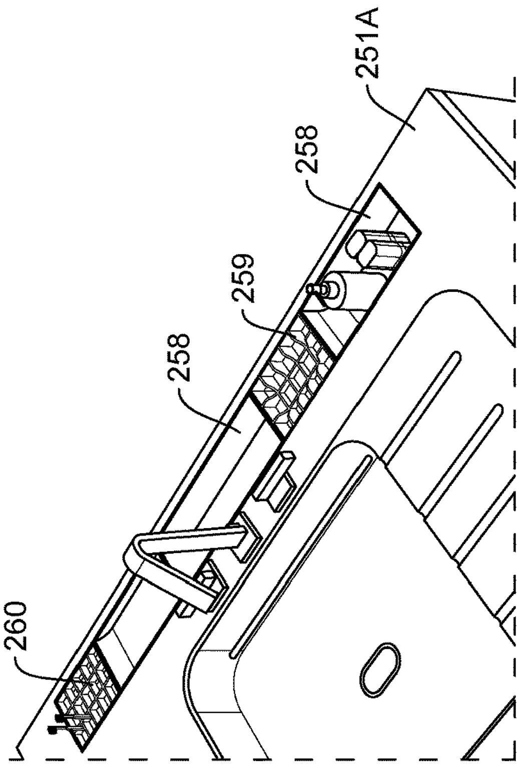
Figure 29A:
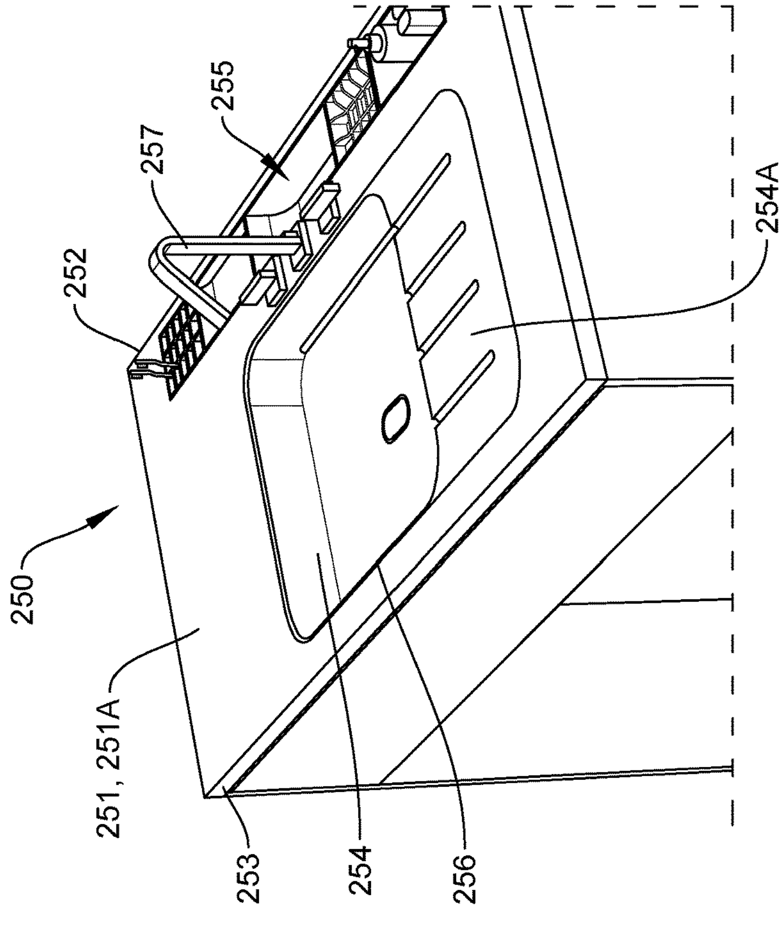

FIGS. 29A-B are schematic diagrams of a cabinet 250 according to another embodiment. The cabinet 250 includes a countertop 251 having front edge 253 and a rear edge 252, a basin 254 having an opening 256 surrounded by the countertop 251, a faucet 257 positioned between the basin opening 256 and the rear edge 252 of the countertop 251, and a storage area positioned between the faucet and the rear edge of the countertop. The storage area 255 may include one or more areas or functionalities, including a portion 258 recessed from a top surface 251A of the countertop 251 to hold items, a draining (or non-draining) soap holder, a brush holder portion 260 (which may have a bottom recessed from a top surface of the countertop), and/or a drainage area 254A adjacent to the basin 254.

The features of the cabinets of FIGS. 28A-29C may be combined with any of the features recited above for FIGS. 1-27.

Adaptive Task Lighting

The following is a discussion of various embodiments for a bathroom mirror lighting system. The concepts discussed may be applied to a variety of bathroom lights, including mirror lights, wall sconces, ceiling lights, and down lights.

Figure 30:
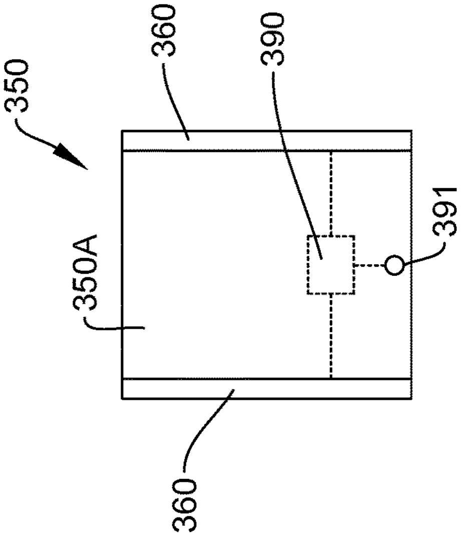
FIG. 30 is a schematic diagram of a bathroom mirror lighting system according to one embodiment.

FIG. 30 is a schematic diagram of a bathroom mirror lighting system according to one embodiment. The system 350 includes a mirror 350, a light source 360, a sensor 391, and a control circuit 390 operably coupled to the light source and the sensor, the control circuit configured to receive a sensor signal. As will be discussed in further detail below, the sensor signal may be indicative of a number of conditions, such as at least one of a user's distance from the sensor, a user's position, a user's posture, a motion of the user towards or away from the sensor, or a task being performed by the user. The control circuit is further configured to transmit a control signal to the light source 360 causing the light source to alter its light output based on the sensor signal from the sensor 391. As used herein, the control signal and/or the sensor signal may each comprise a plurality of signals, rather than just a single signal.

Figure 31A:
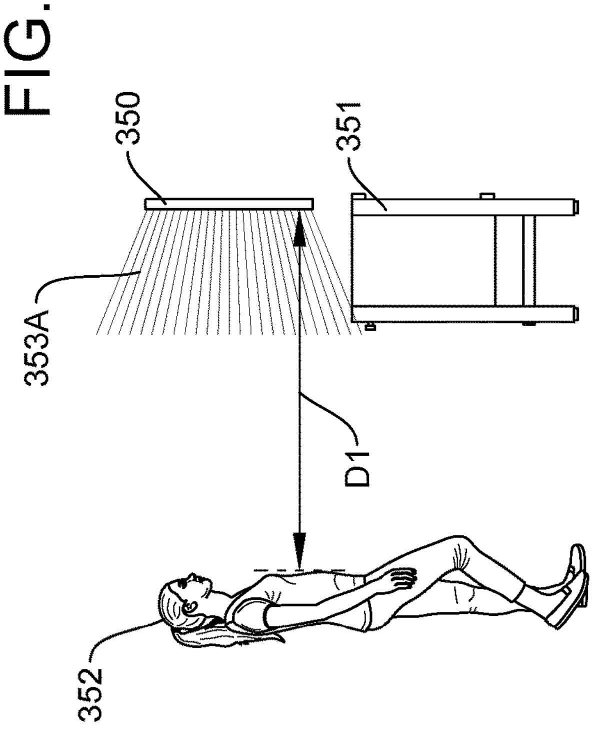
FIGS. 31A-C are schematic diagrams of a bathroom mirror lighting system according to one embodiment.
Figure 31B:
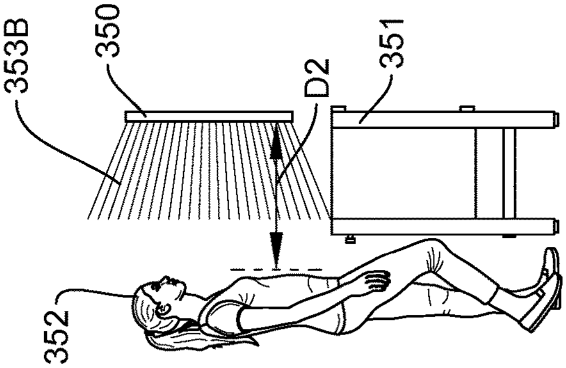
Figure 31C:
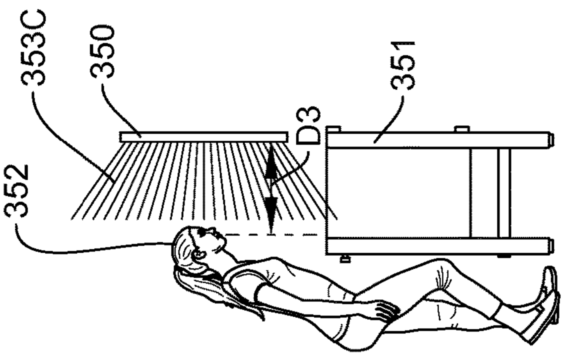

FIGS. 31A-C are schematic diagrams of a bathroom mirror lighting system according to one embodiment. Each diagram includes a user 352, a system 350, and a cabinet 351. As the user 352 decreases his or her distance from D1 to D2 to D3, the light output (353A, 353B, and 353C, respectively) alters. In this embodiment, the light becomes brighter (20% intensity, to 60% intensity, to 100% intensity) as the user gets closer. The system can also provide more focused light based on posture, such as the user 352 leans forward as in FIG. 31C. The system can also alter the color temperature of the light based on a sensor signal.

Figure 32:
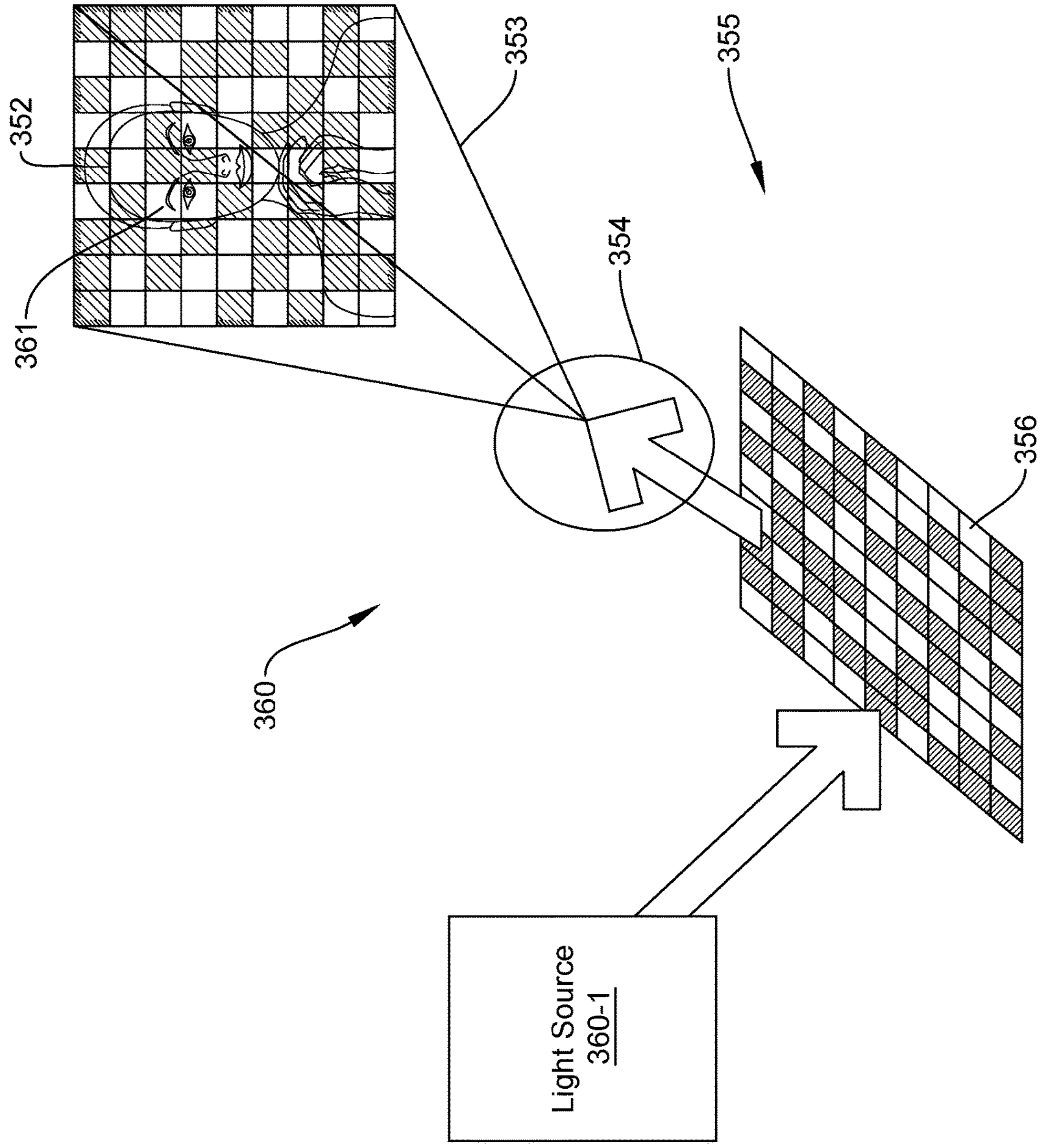
FIG. 32 is a schematic diagram of a light source according to one embodiment.

FIG. 32 is a schematic diagram of a light source 360 utilizing a digital light processing (DLP) projector 355. A component light source 360-1 provides light to an array of micro mirrors 356. The micro mirrors 356 direct light to a lens 354 that provides a light output 353. FIG. 32 shows the light output 353 being provided to a user 352. The light output can be focused on a specific portion 361 of the user 352.

Figure 33B:
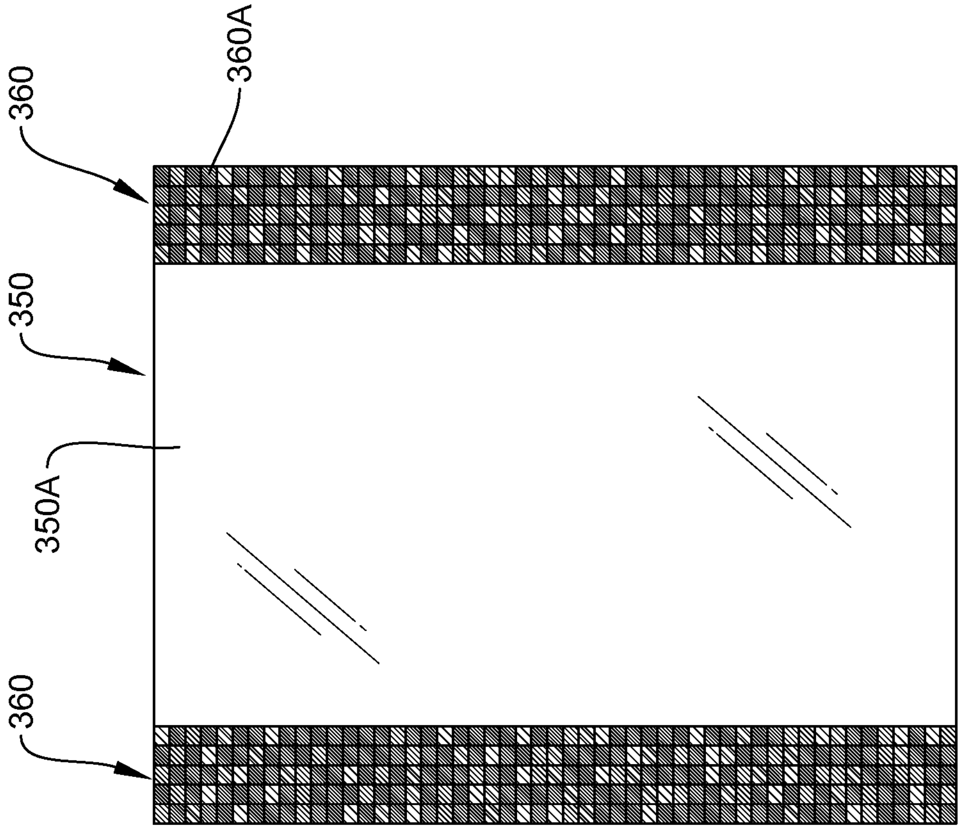
FIGS. 33A-B are schematic diagrams of bathroom mirror lighting system according to another embodiment.
Figure 33A:
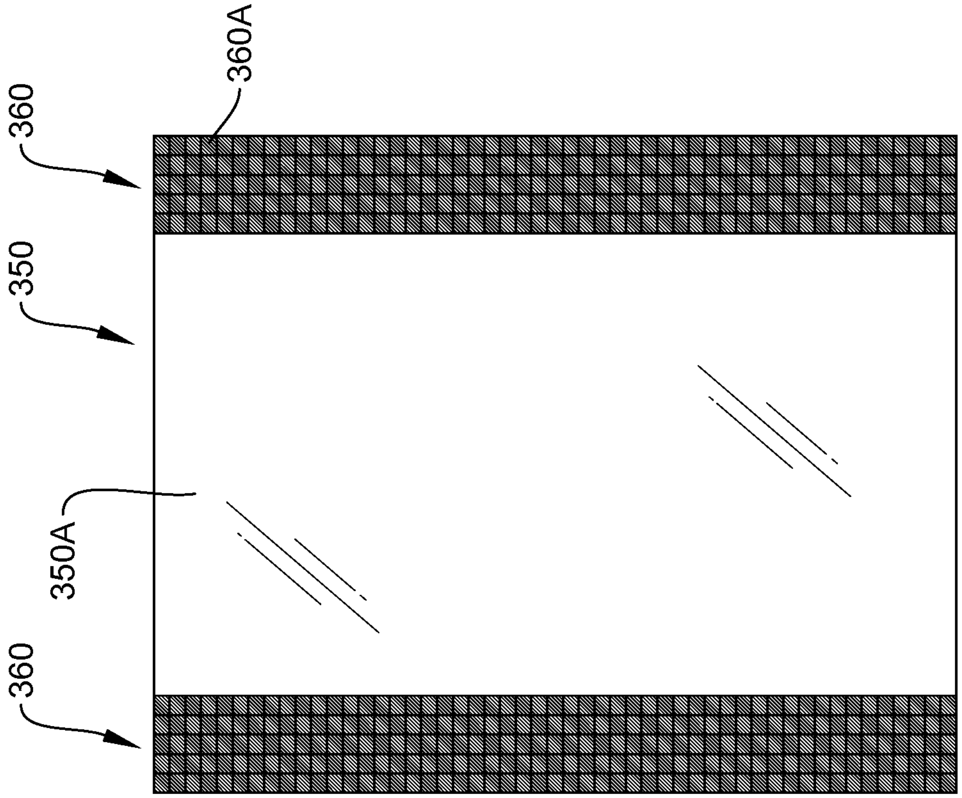

FIGS. 33A-B are schematic diagrams of bathroom mirror lighting system 350 according to another embodiment. On either side of the mirror 350A are light sources 360. Each light source 360 comprises a plurality of component light sources 360A in a matrix configuration. These light sources may be LEDs, but are not so limited. In FIG. 33A, the component light sources 360A are turned ON at a similar setting. In FIG. 33B, the component light sources 360A are at different settings. Each of the component light sources 360A may be individually controlled by the control circuit. Through this control, the light output could focus more light on the user, or on a specific portion of the user, based on some input, such as a sensor signal.

Figure 34:
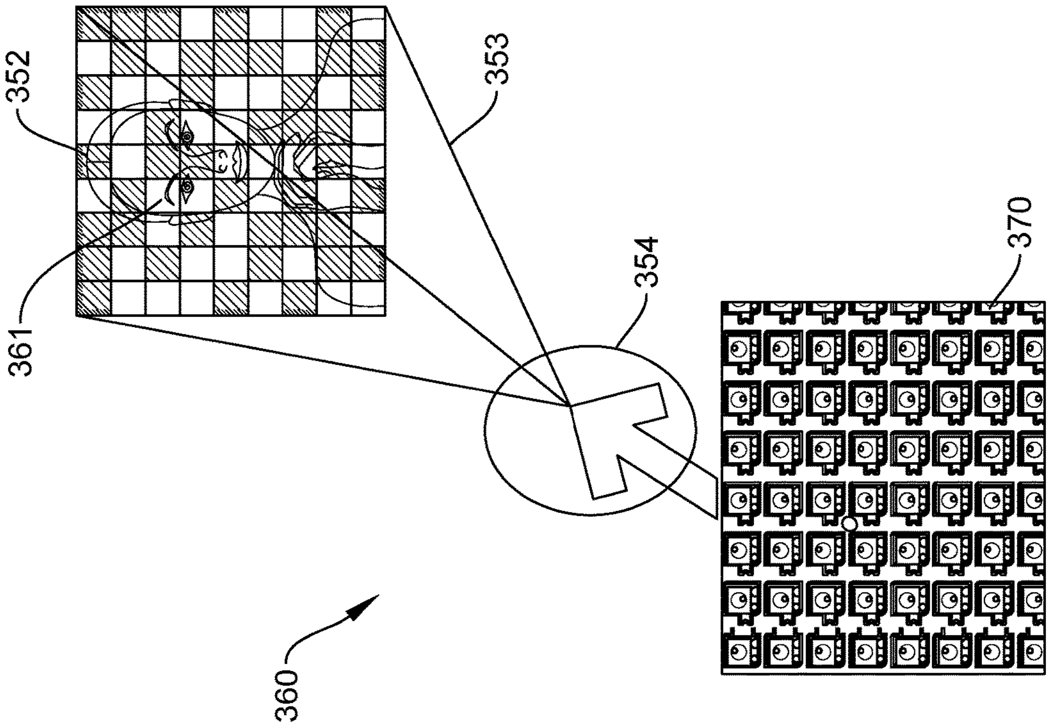
FIG. 34 is a schematic diagram of a light source according to another embodiment.

FIG. 34 is a schematic diagram of a light source 360 utilizing an LED matrix 370. The LED matrix 370 provides light to a lens 354 that provides a light output 353 to a user 352. The light output can be focused on a specific portion 361 of the user 352.

Figure 35A:
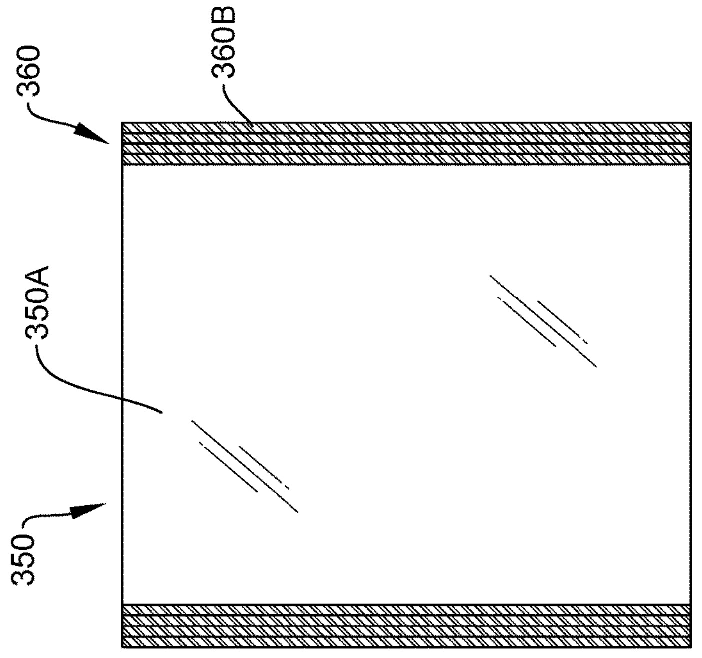
FIGS. 35A-D are schematic diagrams of a bathroom mirror lighting system according to another embodiment.
Figure 35B:
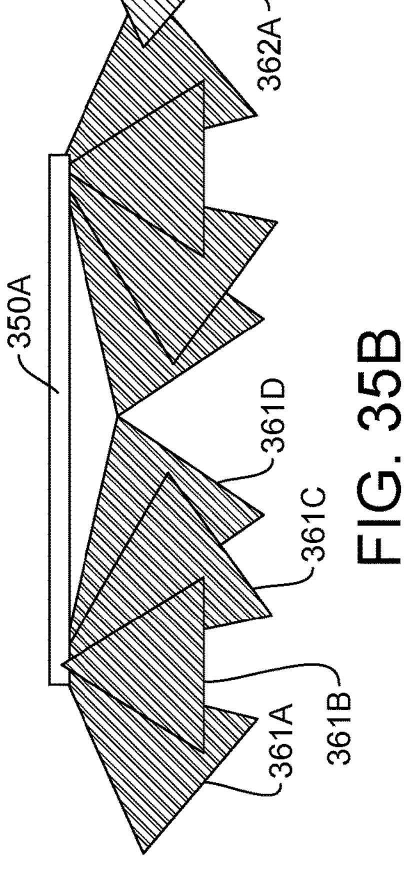
Figure 35C:
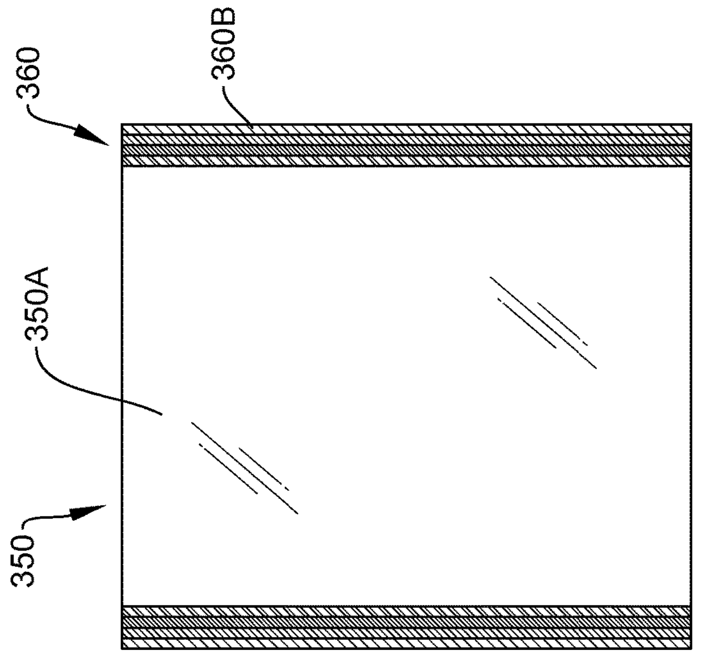
Figure 35D:
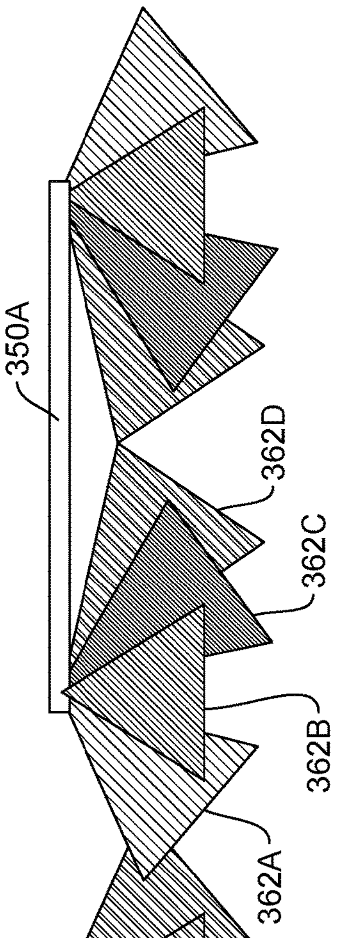

FIGS. 35A-D are schematic diagrams of a bathroom mirror lighting system according to another embodiment. FIGS. 35A and 35B are a front view and a top view of the system 350 where each individual light source 360B of the light sources 360 is at a similar setting. Thus, the light outputs 361A-D are similar. FIGS. 35C and 35D, by contrast, are front and top views of the system 350A where the individual light sources 360B are at different settings. Thus, the light outputs 362A-D are different for the different individual light sources 360B, by energizing different light sources differently (e.g., different intensity or color), more preferred light outputs may be provided. For example, altering the intensity of different light sources can cause more light to be focused on the user.

Figure 36C:
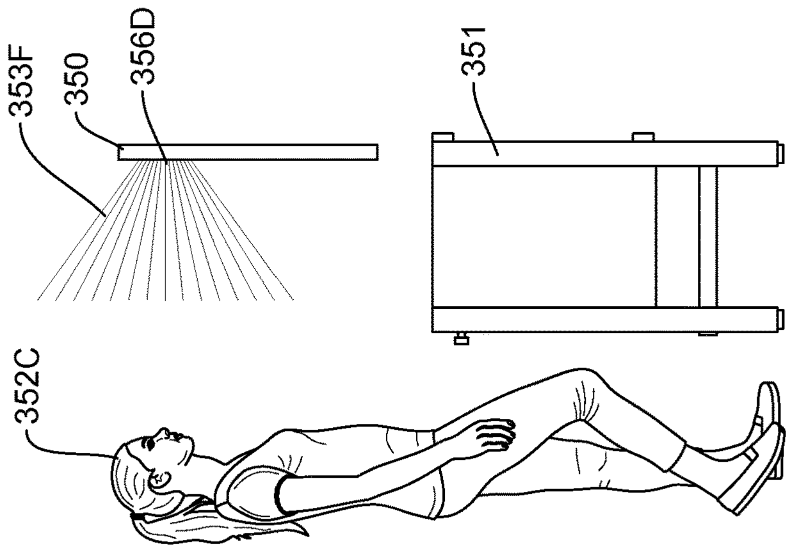
FIGS. 36A-C are schematic diagrams of a bathroom mirror lighting system according to another embodiment.
Figure 36B:
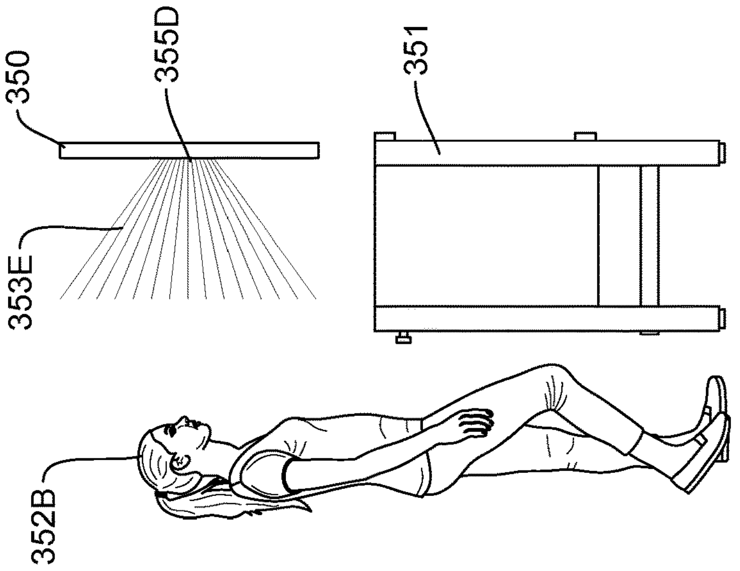
Figure 36A:
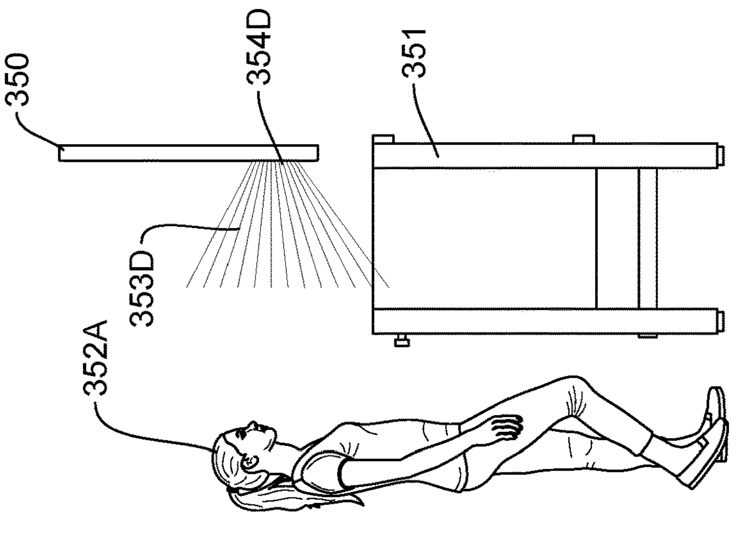

FIGS. 36A-C are schematic diagrams of a bathroom mirror lighting system according to another embodiment. Each diagram includes a user, a system 350, and a cabinet 351, but the users have different heights. The first user 352A is the shortest. As a result, the system 350 utilizes a first light output area 345D to provide a light output 353D. The next user 352B is taller. Thus, the light output area 355 is higher up on the system 350 to provide a higher light output 353E. The final user 353B is tallest. Thus, the light output area 356D is near the top of the system 350 to provide a higher light output 353F. Height may be detected in a variety of ways, such as sensor like that shown in FIG. 30, or by sensors that can identify the height of the face.

Figure 37C:
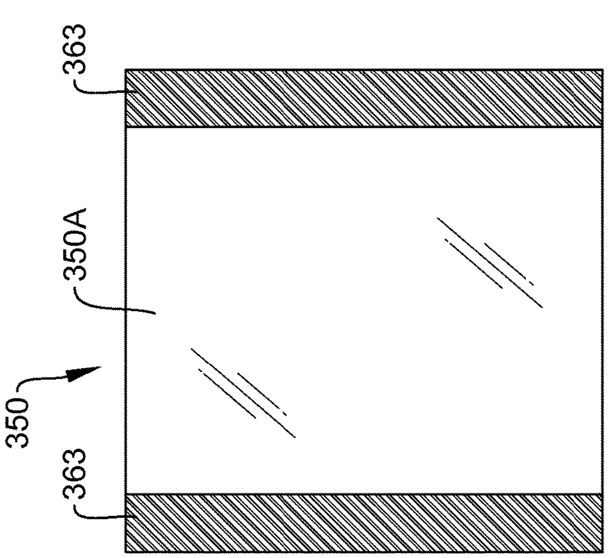
FIGS. 37A-D are schematic diagrams of a bathroom mirror lighting system according to another embodiment.
Figure 37D:
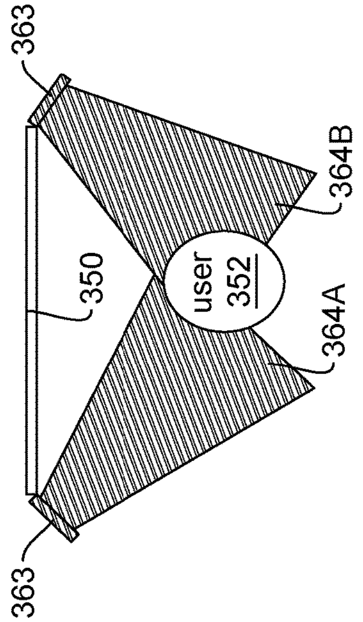
Figure 37A:
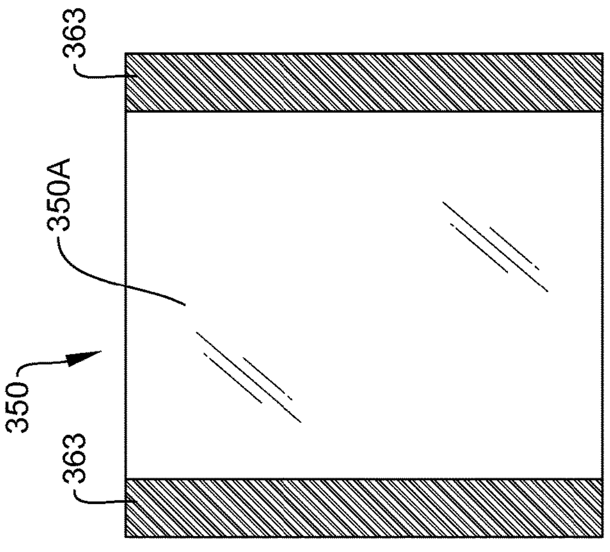
Figure 37B:
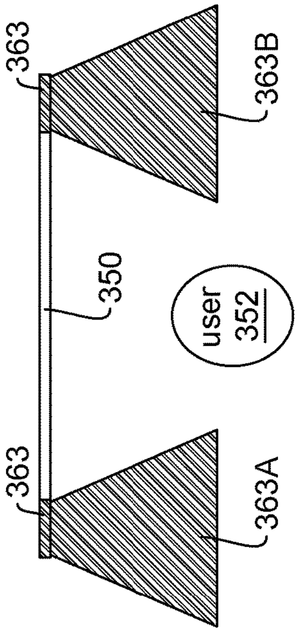

FIGS. 37A-D are schematic diagrams of a bathroom mirror lighting system according to another embodiment. FIGS. 37A and 37B show a system 350 (front view and top view) where the light sources 363 are in a first position by which they direct light 363A, 363B straight. FIGS. 37C and 37D show the system 350 (front view and top view) where the light source mechanically alter their position (e.g., in response to motor receiving a signal from the control circuit in response to a sensor signal). In these figures, the light output 364A, 364B has been redirected towards the user 352. It is noted that, in this embodiment, the light source is separate from the mirror, though the disclosure is not so limited.

Figures 38A, 38B, 38C, 38D:
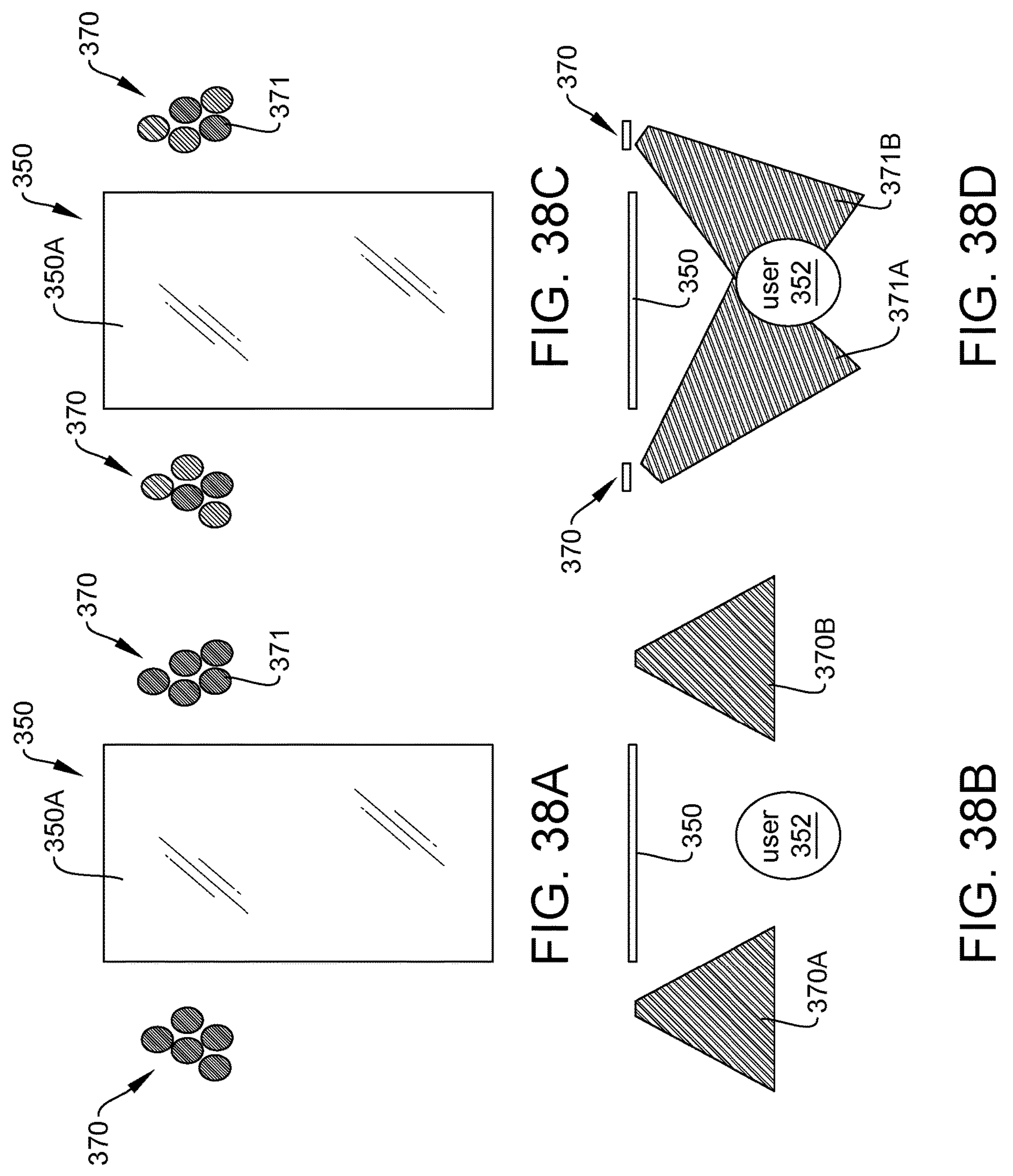
FIGS. 38A-D are schematic diagrams of a bathroom mirror lighting system according to another embodiment.

FIGS. 38A-D are schematic diagrams of a bathroom mirror lighting system similar to FIGS. 37A-D, but here light is redirected by energizing different component light sources 371. FIGS. 38A and 38B show a system 350 (front view and top view) where the light sources 370 are similarly energized, causing light 370A, 370B to be directed straight. FIGS. 38C and 38D show the system 350 (front view and top view) where the light source 370 energizes different individual light sources 371 differently, thus causing the light output 371A, 371B to be directed towards the user 352.

While the inventions have been described with respect to specific examples including presently preferred modes of carrying out the inventions, those skilled in the art will appreciate that there are numerous variations and permutations of the above described systems and techniques. It is to be understood that other embodiments may be utilized and structural and functional modifications may be made without departing from the scope of the present inventions. Thus, the spirit and scope of the inventions should be construed broadly as set forth in the appended claims.

What is claimed is:

1. A bathroom mirror lighting system comprising:
- a mirror;
- a light source;
- a sensor; and
- a control circuit operably coupled to the light source and the sensor, the control circuit configured to:
  - receive a sensor signal from the sensor indicative of at least one of a user's distance from the sensor, a user's position, a user's posture, a motion of the user towards or away from the sensor, or a task being performed by the user; and
  - transmit a control signal to the light source causing the light source to alter its light output based on the sensor signal from the sensor,
  - wherein the light source comprises a plurality of lights, each of which is independently alterable by the control signal.

2. The bathroom mirror lighting system of claim 1 wherein the alteration of the light output comprises an alteration of light intensity.

3. The bathroom mirror lighting system of claim 1 wherein the alteration of the light output comprises an alteration of light direction.

4. The bathroom mirror lighting system of claim 1 wherein the alteration of the light output comprises an alteration of light color temperature.

5. The bathroom mirror lighting system of claim 1 wherein the altering of the light output comprises altering a portion of the plurality of lights.

6. The bathroom mirror lighting system of claim 5 wherein the altering of a portion of the lights causes an alteration of light direction.

7. The bathroom mirror lighting system of claim 1 wherein the control signal or the sensor signal comprises a plurality of signals.

8. The bathroom mirror lighting system of claim 1 wherein the light source comprises a digital light processing (DLP) projector.

9. The bathroom mirror lighting system of claim 8 wherein the DLP projector comprises:
- a first light source; and
- a DLP array of micro mirrors receiving light from the light source;
- wherein the alteration of the micro mirrors of the DLP array causes the alteration to the light output.

10. The bathroom mirror lighting system of claim 9 wherein the alteration of the light output causes the light output to focus the light output on the user or on a specific portion of the user.

11. The bathroom mirror lighting system of claim 1 wherein the light source is separate from the mirror.

12. The bathroom mirror lighting system of claim 1 wherein the alteration of the light output is caused by the control signal causing the light source to mechanically alter its position.

13. A bathroom mirror lighting system comprising:
- a mirror;
- a light source;
- a sensor; and
- a control circuit operably coupled to the light source and the sensor, the control circuit configured to:
  - receive a sensor signal from the sensor indicative of at least one of a user's distance from the sensor, a user's position, a user's posture, a motion of the user towards or away from the sensor, or a task being performed by the user; and
  - transmit a control signal to the light source causing the light source to alter its light output based on the sensor signal from the sensor, wherein the alteration of the light output comprises an alteration of a light output area.

14. A bathroom mirror lighting system comprising:
- a mirror;
- a light source;
- a sensor; and
- a control circuit operably coupled to the light source and the sensor, the control circuit configured to:

receive a sensor signal from the sensor indicative of at least one of a user's distance from the sensor, a user's position, a user's posture, a motion of the user towards or away from the sensor, or a task being performed by the user; and transmit a control signal to the light source causing the light source to alter its light output based on the sensor signal from the sensor, wherein the light source comprises an LED matrix comprising a plurality of LEDs, wherein the alteration of individual LEDs of the plurality of LEDs causes the alteration of the light output.

15. The bathroom mirror lighting system of claim 14 wherein the alteration of the light output causes the light output to focus the light output on the user or on a specific portion of the user.

* * * * *